(12) United States Patent
Feldman et al.

(10) Patent No.: US 8,712,852 B2
(45) Date of Patent: *Apr. 29, 2014

(54) SYSTEMS, METHODS, AND DEVICES FOR SELLING TRANSACTION INSTRUMENTS VIA WEB-BASED TOOL

(75) Inventors: Gennye Hannover Feldman, New York, NY (US); Elizabeth Anne Holt, Salt Lake City, UT (US); Marc Rubner, Scottsdale, AZ (US); John R. Rose, Layton, UT (US); Nicole Milne Vollmer, Murray, UT (US)

(73) Assignee: Sharecomm Limited Liability Company, Dover, DE (US)

( * ) Notice: Subject to any disclaimer, the term of this patent is extended or adjusted under 35 U.S.C. 154(b) by 1194 days.

This patent is subject to a terminal disclaimer.

(21) Appl. No.: 12/118,590

(22) Filed: May 9, 2008

(65) Prior Publication Data
US 2008/0215449 A1 Sep. 4, 2008

Related U.S. Application Data

(63) Continuation of application No. 11/671,287, filed on Feb. 5, 2007, now Pat. No. 7,431,208, which is a continuation of application No. 10/905,888, filed on Jan. 25, 2005, now Pat. No. 7,191,939.

(60) Provisional application No. 60/552,842, filed on Mar. 12, 2004, provisional application No. 60/553,781, filed on Mar. 17, 2004, provisional application No. 60/522,955, filed on Nov. 24, 2004.

(51) Int. Cl.
*G06Q 20/00* (2012.01)
*G06Q 30/00* (2012.01)
*G06K 5/00* (2006.01)

(52) U.S. Cl.
USPC .............................. 705/16; 705/26.1; 235/380

(58) Field of Classification Search
None
See application file for complete search history.

(56) References Cited

U.S. PATENT DOCUMENTS

| | | |
|---|---|---|
| 5,023,782 A | 6/1991 | Lutz et al. |
| 5,494,544 A | 2/1996 | Hill et al. |
| 5,577,109 A | 11/1996 | Stimson et al. |
| 5,621,787 A | 4/1997 | McKoy et al. |
| 5,627,909 A | 5/1997 | Blaylock et al. |
| 5,637,845 A | 6/1997 | Kolls |
| 5,661,289 A | 8/1997 | Sasou et al. |

(Continued)

OTHER PUBLICATIONS

Office Action mailed Sep. 19, 2006 in U.S. Appl. No. 10/905,888.

(Continued)

*Primary Examiner* — Asfand Sheikh

(57) ABSTRACT

The present invention generally relates to a system and method for distributing a transaction instrument. The system includes the steps of: offering for sale, in a retail environment, the transaction instrument; selling a selected transaction instrument; communicating with the issuer of the transaction instrument via an internet accessible web site, and enabling the use of the transaction instrument. The transaction instrument may be, for example, an open pre-paid card. The distribution of the transaction instrument may also include the step of sending a message, through the web site, in substantially real time, causing the pre-paid transaction instrument to be funded but not activated until later through an interactive voice response system, for example. In another example, an associated transaction account may be funded and activated at the time of distribution. Furthermore, an issuer system may be suitably configured to leverage existing Travelers Cheque infrastructure for inventory and related processes.

20 Claims, 7 Drawing Sheets

(56) References Cited

U.S. PATENT DOCUMENTS

| | | | |
|---|---|---|---|
| D385,488 S | 10/1997 | Smith et al. |
| 5,721,768 A | 2/1998 | Stimson et al. |
| 5,724,523 A | 3/1998 | Longfield |
| 5,760,381 A | 6/1998 | Stich et al. |
| 5,769,269 A | 6/1998 | Peters |
| 5,777,305 A | 7/1998 | Smith et al. |
| 5,791,474 A | 8/1998 | Hansen |
| 5,903,633 A | 5/1999 | Lorsch |
| 5,903,830 A | 5/1999 | Joao et al. |
| 5,903,876 A | 5/1999 | Hagemier |
| 5,918,909 A | 7/1999 | Fiala et al. |
| 5,953,710 A | 9/1999 | Fleming |
| 5,971,276 A | 10/1999 | Sano et al. |
| RE36,365 E | 11/1999 | Levine et al. |
| 5,988,509 A | 11/1999 | Taskett |
| 6,000,608 A | 12/1999 | Dorf |
| 6,000,832 A | 12/1999 | Franklin et al. |
| 6,003,016 A | 12/1999 | Hagemier |
| 6,003,763 A | 12/1999 | Gallagher et al. |
| 6,032,136 A | 2/2000 | Brake, Jr. et al. |
| 6,044,360 A | 3/2000 | Picciallo |
| 6,050,493 A | 4/2000 | Fertig |
| 6,105,009 A | 8/2000 | Cuervo |
| 6,106,020 A | 8/2000 | Leef et al. |
| 6,134,309 A | 10/2000 | Carson |
| 6,145,665 A | 11/2000 | Krahn |
| 6,145,741 A | 11/2000 | Wisdom et al. |
| 6,167,387 A | 12/2000 | Lee Wai Yin |
| 6,169,975 B1 | 1/2001 | White et al. |
| 6,173,269 B1 | 1/2001 | Solokl et al. |
| 6,175,823 B1 | 1/2001 | Van Dusen |
| 6,189,787 B1 | 2/2001 | Dorf |
| RE37,122 E | 4/2001 | Levine et al. |
| 6,209,292 B1 | 4/2001 | Krahn |
| 6,224,108 B1 | 5/2001 | Klure |
| 6,270,012 B1 | 8/2001 | Dawson |
| 6,298,336 B1 | 10/2001 | Davis et al. |
| 6,328,341 B2 | 12/2001 | Klure |
| 6,386,444 B1 | 5/2002 | Sullivan |
| 6,386,457 B1 | 5/2002 | Sorie |
| 6,405,182 B1 | 6/2002 | Cuervo |
| 6,415,142 B1 | 7/2002 | Martineau |
| 6,422,459 B1 | 7/2002 | Kawan |
| 6,439,613 B2 | 8/2002 | Klure |
| 6,454,165 B1 | 9/2002 | Dawson |
| 6,467,684 B2 | 10/2002 | Fite et al. |
| 6,473,500 B1 | 10/2002 | Risafi et al. |
| 6,502,745 B1 | 1/2003 | Stimson et al. |
| 6,505,171 B1 | 1/2003 | Cohen et al. |
| 6,507,644 B1 | 1/2003 | Henderson et al. |
| 6,543,809 B1 | 4/2003 | Kistner et al. |
| 6,546,373 B1 | 4/2003 | Cerra |
| 6,563,805 B1 | 5/2003 | Ma et al. |
| 6,575,361 B1 | 6/2003 | Graves et al. |
| 6,581,827 B2 | 6/2003 | Welton |
| 6,588,658 B1 | 7/2003 | Blank |
| 6,612,487 B2 | 9/2003 | Tidball et al. |
| 6,615,189 B1 | 9/2003 | Phillips et al. |
| 6,615,190 B1 | 9/2003 | Slater |
| 6,715,795 B2 | 4/2004 | Klure |
| 6,805,289 B2 | 10/2004 | Noriega |
| 6,820,802 B2 | 11/2004 | Biggar et al. |
| 6,820,803 B1 | 11/2004 | Browning et al. |
| 6,829,596 B1 | 12/2004 | Frazee |
| 6,832,720 B2 | 12/2004 | Dawson |
| 6,837,426 B2 | 1/2005 | Tidball et al. |
| 6,892,187 B2 | 5/2005 | Phillips et al. |
| 6,918,537 B2 | 7/2005 | Graves et al. |
| 7,093,761 B2 | 8/2006 | Smith et al. |
| 7,191,939 B2 * | 3/2007 | Beck et al. ............... 235/380 |
| 2001/0001472 A1 | 5/2001 | Sano et al. |
| 2001/0001856 A1 | 5/2001 | Gould et al. |
| 2001/0038033 A1 | 11/2001 | Habib |
| 2001/0042784 A1 | 11/2001 | Fite et al. |
| 2001/0044733 A1 | 11/2001 | Lee et al. |
| 2001/0047342 A1 | 11/2001 | Cuervo |
| 2001/0047406 A1 | 11/2001 | Araujo et al. |
| 2002/0026418 A1 | 2/2002 | Koppel et al. |
| 2002/0046341 A1 | 4/2002 | Kazaks et al. |
| 2002/0052852 A1 | 5/2002 | Bozeman |
| 2002/0066783 A1 | 6/2002 | Sawin |
| 2002/0077973 A1 | 6/2002 | Ronchi et al. |
| 2002/0091573 A1 | 7/2002 | Hodes |
| 2002/0099667 A1 | 7/2002 | Diamandis et al. |
| 2002/0103672 A1 | 8/2002 | Torres et al. |
| 2002/0117541 A1 | 8/2002 | Biggar et al. |
| 2002/0120530 A1 | 8/2002 | Sutton et al. |
| 2002/0153414 A1 | 10/2002 | Stoutenburg et al. |
| 2002/0156683 A1 | 10/2002 | Stoutenburg et al. |
| 2002/0174016 A1 | 11/2002 | Cuervo |
| 2003/0004828 A1 | 1/2003 | Epstein |
| 2003/0028439 A1 | 2/2003 | Cox et al. |
| 2003/0046249 A1 | 3/2003 | Wu |
| 2003/0053609 A1 | 3/2003 | Risafi et al. |
| 2003/0078883 A1 | 4/2003 | Stewart et al. |
| 2003/0168510 A1 | 9/2003 | Allen |
| 2003/0183689 A1 | 10/2003 | Swift et al. |
| 2003/0187790 A1 | 10/2003 | Swift et al. |
| 2003/0197059 A1 | 10/2003 | Tidball et al. |
| 2003/0197060 A1 | 10/2003 | Coyner |
| 2003/0200179 A1 | 10/2003 | Kwan |
| 2003/0212796 A1 | 11/2003 | Willard |
| 2004/0007618 A1 | 1/2004 | Oram et al. |
| 2004/0011864 A1 | 1/2004 | Thompson et al. |
| 2004/0011866 A1 | 1/2004 | Saad |
| 2004/0181454 A1 | 9/2004 | Manno |
| 2005/0021363 A1 | 1/2005 | Stimson et al. |
| 2006/0273153 A1 | 12/2006 | Ashby et al. |

OTHER PUBLICATIONS

Office Action mailed Feb. 12, 2008 in U.S. Appl. No. 11/671,287.
Office Action mailed Mar. 20, 2009 in U.S. Appl. No. 12/118,581.
Final Office Action mailed Jul. 16, 2009 in U.S. Appl. No. 12/118,581.
Advisory Action mailed Sep. 14, 2009 in U.S. Appl. No. 12/118,581.
PCT; Written Opinion dated Oct. 3, 2006 in Application No. PCT/US2005/002810.
PCT; International Search Report dated Oct. 3, 2006 in Application No. PCT/US2005/002810.
PCT; International Preliminary Report on Patentability dated Nov. 1, 2006 in Application No. PCT/US2005/002810.
USPTO; Notice of Allowance dated Jun. 29, 2010 in U.S. Appl. No. 12/118,581.
USPTO; Advisory Action dated Mar. 3, 2010 in U.S. Appl. No. 12/118,581.
USPTO; Final Office Action dated Jan. 29, 2010 in U.S. Appl. No. 12/118,581.
USPTO; Office Action dated Oct. 8, 2009 in U.S. Appl. No. 12/118,581.
Menezes, Bill. "Activation Process Becomes Critical." Wireless Week 9.2 (2003): 22. Computers & Applied Sciences Complete. EBSCO.
USPTO; Notice of Allowance dated Jan. 24, 2011 in U.S. Appl. No. 12/118,573.
USPTO; Office Action dated Nov. 12, 2010 in U.S. Appl. No. 12/118,573.
Notice of Allowance mailed Dec. 13, 2006 in U.S. Appl. No. 10/905,663.
Supplemental Notice of Allowance mailed Feb. 13, 2007 in U.S. Appl. No. 10/905,663.
ISR and Written Opinion mailed Jan. 17, 2006 in PCT/US05/02815.
Notice of Allowance mailed Sep. 10, 2007 in U.S. Appl. No. 11/556,953.
Notice of Allowance mailed Jan. 11, 2007 in U.S. Appl. No. 10/905,888.
Notice of Allowance mailed Aug. 25, 2008 in U.S. Appl. No. 11/671,287.

* cited by examiner

SYSTEMS, METHODS, AND DEVICES FOR SELLING TRANSACTION INSTRUMENTS VIA WEB-BASED TOOL

CROSS-REFERENCE TO RELATED APPLICATIONS

This application is a continuation of and claims priority to U.S. patent application Ser. No. 11/671,287, entitled "SYSTEMS, METHODS, AND DEVICES FOR SELLING TRANSACTION INSTRUMENTS VIA WEB-BASED TOOL," filed on Feb. 5, 2007, which has since issued on Oct. 7, 2008 as U.S. patent application NO. 7,431,208, application is a continuation of and claims priority to U.S. patent application Ser. No. 10/905,888, entitled "SYSTEMS, METHODS, AND DEVICES FOR SELLING TRANSACTION INSTRUMENTS VIA WEB-BASED TOOL," filed on Jan. 25, 2005, which has since issued on Mar. 20, 2007 as U.S. Pat. No. 7,191,939. The '888 application claims priority to, and the benefit of, U.S. Provisional Application Ser. No. 60/552,842, entitled "SYSTEM, METHOD FOR PRE-PAID CARD RETAIL DISTRIBUTION," filed Mar. 12, 2004; U.S. Provisional Application Ser. No. 60/553,781, entitled "SYSTEM, METHOD FOR DISTRIBUTION OF GIFT CARDS," filed Mar. 17, 2004; and U.S. Provisional Application Ser. No. 60/522,955, entitled "PREPAID CARD IN-PERSON RETAIL DISTRIBUTION INVENTORY MANAGEMENT PROCESS," filed Nov. 24, 2004, all which are incorporated herein by reference.

FIELD OF INVENTION

The present invention generally relates to transaction accounts, and more particularly, to systems and methods for facilitating the distribution of transaction instruments.

BACKGROUND OF THE INVENTION

Consumers may use a transaction account, which may be associated with an account number and/or transaction instrument (e.g., charge card, credit card, debit card, gift card, etc.), as a form of payment or for identification in various transactions. Transaction instruments are desirable for a number of reasons such as, for example, utilizing a transaction instrument associated with a stored value (e.g., pre-paid) card may be a safe and convenient way to avoid carrying or handling cash and loose change. Also, it is often convenient to give pre-paid cards as gifts or to use pre-paid cards to pay for transactions while traveling.

Stored value cards are forms of transaction instruments associated with transaction accounts, wherein the stored value cards provide cash equivalent value that may be used within an existing payment/transaction infrastructure. Stored value cards are frequently referred to as gift, pre-paid or cash cards, in that money is deposited in the account associated with the card before use of the card is allowed. If a customer deposits ten dollars of value into the account associated with the card, the card may be used for payments up to ten dollars.

"Open cards" are cards that are generally accepted at different merchants. Examples of open cards include American Express®, Visa®, and Discover®, MasterCard® cards, which may be used at many different retailers and other businesses. In contrast, "closed cards" are cards that may be restricted to use in a particular store or within a particular chain of a stores. One example of a closed card is a pre-paid gift card that may only be purchased at, and only be accepted at, a clothing retailer, such as The Gap®.

In distributing open cards, additional security issues often exist compared to distributing closed cards. For example, open cards may be used in more places and through a variety of authentication systems. Thus, issuer's of open cards typically do not sell those cards as off the shelf items. In fact, open cards are generally distributed through the mail. Another method of distributing an open card involves selling a dummy 'off-the shelf' card to a customer, whereupon a working card is later mailed to the customer. In both cases, the mailed card is generally pre-funded or pre-approved, and for security reasons, the recipient typically calls an interactive voice response ("IVR") system to activate the card. However, the delay caused by the mailing process hinders the distribution of transaction instruments.

Banks may also distribute cards that are pre-funded and then activated via IVR, but these cards are generally kept securely behind the counter and not within the customer's reach. However, it is also desirable to distribute transaction instruments through additional channels other than banks. For example, it may be convenient for consumers to purchase transaction instruments while conducting other transactions with a third-party, such as a merchant. Similarly, an individual may wish to purchase a pre-paid card in conjunction with purchasing goods and services. In this regard, retailers such as The Gap®, sell private label, closed pre-paid cards wherein a message is transmitted to a host computer from the purchasing location upon purchase that funds and activates the card.

In addition, limitations currently exist in the amount and types of information that may be communicated between distributors of transaction instruments and the issuer of the transaction instruments. Furthermore, such communications are often delayed to a point that the usefulness of the communications is reduced. In one example, the sale of transaction instruments is communicated to the issuer through batch processes at the close of a business day.

Thus, although various systems exist for distributing transaction instruments, various funding systems have been used, and various methods exist for activating a transaction account, additional systems and methods are desired to facilitate the distribution of transaction instruments. Furthermore, a need exists for systems and methods that enable a consumer to more conveniently obtain a transaction instrument such as a stored value card.

SUMMARY OF THE INVENTION

The present invention generally relates to a system and method for distributing a transaction instrument. The method includes the steps of: offering for sale, in a retail or mall environment, the transaction instrument; selling a customer selected transaction instrument; communicating with the issuer of the transaction instrument via an internet accessible web site, and enabling the use of the transaction instrument. The transaction instrument may be, for example, an open pre-paid card. The distribution of the transaction instrument may also comprise the step of sending a message, through the web site, in substantially real time, causing the pre-paid transaction instrument to be funded but not activated until later through an interactive voice response system, for example. In another exemplary embodiment, the message sent through the web site may cause the pre-paid transaction instrument to be funded and activated at approximately the time of purchase. In accordance with further exemplary embodiments, an issuer system is configured to leverage existing Travelers Cheque infrastructure for inventory and related processes.

BRIEF DESCRIPTION OF THE DRAWINGS

A more complete understanding of the present invention may be derived by referring to the detailed description and claims when considered in connection with the Figures, wherein like reference numbers refer to similar elements throughout the Figures, and:

DETAILED DESCRIPTION OF EXEMPLARY EMBODIMENTS

While the exemplary embodiments herein are described in sufficient detail to enable those skilled in the art to practice the invention, it should be understood that other embodiments may be realized and that logical and mechanical changes may be made without departing from the spirit and scope of the invention. Thus, the following detailed description is presented for purposes of illustration only and not of limitation.

In general, systems, methods, and devices are suitably configured to facilitate the distribution of a transaction instrument through a distributor (defined below), e.g., a merchant, mall retailer, and/or the like. In one exemplary embodiment of the present invention, distribution of transaction instruments may be facilitated through a distributor accessible web based interface or 'web tool' that is configured to be used at the point of distribution of the transaction instrument. Distribution of transaction instruments may be further facilitated by sending, via the web tool, a "fund but do not activate" message to the issuer (defined below) when the transaction instrument is distributed to the consumer. Distribution of transaction instruments may also be facilitated by using pre-existing Travelers Cheque and/or transaction account infrastructure(s) to process information communicated (either directly or indirectly) from the distributor web tool to the pre-existing infrastructure and/or to provide services related to the transaction account.

Figure 1:
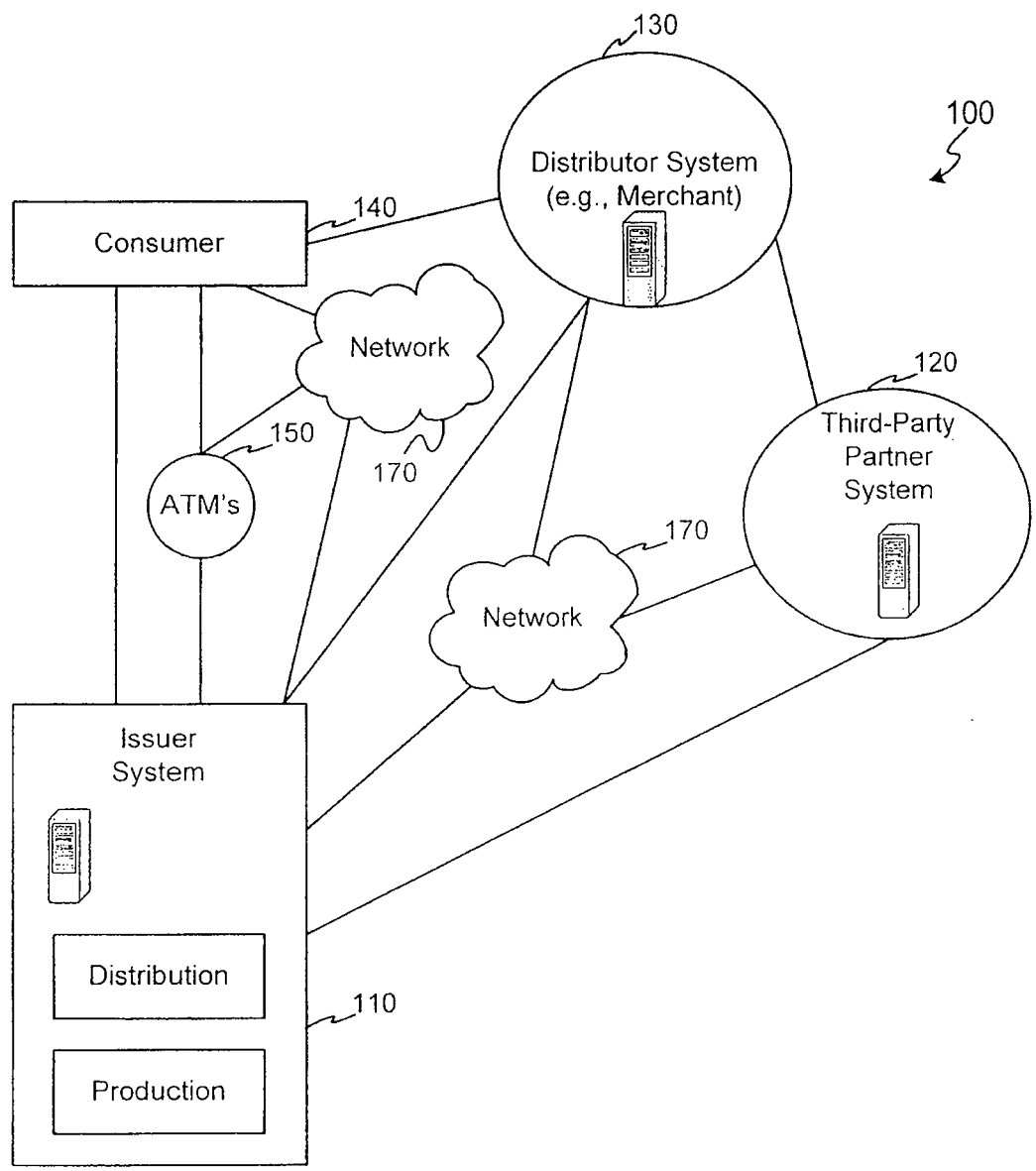
FIG. 1 illustrates a block diagram overview of an exemplary transaction instrument distribution system.

A general exemplary system configuration may include, with reference to FIG. 1, a transaction instrument distribution system 100 which comprises an issuer system 110 and a distributor system 130. Transaction instrument distribution system 100 may also comprise a third-party partner system 120. Issuer system 110 is any person, entity, software and/or hardware suitably configured to issue a transaction instrument to a consumer 140 through a distributor 130 and/or a third-party partner 120. Distribution system 130 is any person, entity, software and/or hardware suitably configured to distribute the transaction instrument to consumer 140. For example, distribution system 130 may be a merchant. Moreover, distribution system 130 may be, for example, a retail mall merchant. Furthermore, third-party partner system 120 may serve as an intermediary between distribution system 130 and issuer system 110. Consumer 140 may use the transaction instrument with various merchants 130, automated teller machines ("ATMs") 150, and/or the like. Thus, issuer system 110 may be suitably configured to communicate with third-party partner system 120, merchant system 130, consumers 140, and/or ATMs 150. In these examples, communications between any of these components may take place in various manners, for example, via a network 170, or via other modes of communication.

The systems and/or components of the systems discussed herein may also include one or more host servers or other computing systems including a processor suitably configured to process digital data, a memory coupled to the processor for storing digital data, an input digitizer coupled to the processor for inputting digital data, an application program stored in the memory and accessible by the processor for directing processing of digital data by the processor, a display coupled to the processor and memory for displaying information derived from digital data processed by the processor and a plurality of databases, the databases including distribution data, customer data, merchant data, financial institution data and/or like data that could be used in association with the present invention. As those skilled in the art may appreciate, a computer may also include an operating system (e.g., Windows NT, 95/98/2000, Linux, Solaris, etc.) as well as various conventional support software and drivers typically associated with computers.

In one exemplary embodiment of the present invention, transaction instrument distribution system 100 is suitably configured to facilitate distribution of transaction instruments through in-person marketing methods. For example, a transaction instrument, such as an open pre-paid card, may be offered by a distributor, e.g., a merchant. The merchant may present the open pre-paid card, for example, by hanging the card on a rack near the check out stand. In this example, the open, pre-paid card is accessible to the customers who may select (i.e., physically obtain) one or more pre-denominated cards, and purchase these cards with the rest of their purchases. Displaying the pre-paid card in a readily accessible manner may thus facilitate convenient acquisition of open pre-paid cards by consumers, and may therefore facilitate distribution of the pre-paid cards. In another embodiment, the merchant may keep the cards behind the counter or otherwise maintain the cards in a manner not directly accessible by customers.

Although frequently described herein as an open pre-paid card which is associated with a transaction account, a transaction instrument, as used herein, may be associated with an open account or a closed account system. The transaction instrument may also exist in a non-physical embodiment. For example, a transaction instrument may be distributed in non-physical embodiments such as an account number, frequent flyer account, telephone calling account, and/or the like. Furthermore, a physical embodiment of a transaction instrument may be distributed as a charge card, credit card, debit card, loyalty card, pre-paid card, diner's card, phone card, transponder, and/or the like.

Furthermore, transaction accounts may be associated with various applications that allow the customers to participate in various programs, such as, for example, loyalty programs. A loyalty program may include one or more loyalty accounts. Exemplary loyalty programs include frequent flyer miles, on-line points earned from viewing or purchasing products at websites on-line, and programs associated with diner's cards, charge cards, credit cards, debit cards, hotel cards, and/or the like. Generally, the user is both the owner of the transaction account and the participant in the loyalty program; however, this association is not necessary. For example, a participant in a loyalty program may gift loyalty points to a user who pays for a purchase with his own transaction instrument, but uses the gifted loyalty points instead of paying the monetary value.

In accordance with another aspect of the present invention, the transaction instrument may be distributed via any suitable distribution technique. For example, the transaction instrument may be purchased by the distributor and resold to a consumer. In another exemplary embodiment, however, the transaction instrument may be consigned to the distributor who, upon sale to a consumer, pays the issuer. Other distribution techniques may also be employed. For example, transaction instruments may be distributed for free, e.g., as part of a promotional activity.

In one exemplary embodiment, the transaction instrument comprises an open pre-paid card that is un-funded and not activated when on display by a merchant. The card is purchased through the web tool as described herein. In a first example, the card is funded upon purchase by a consumer and enabled, i.e. activated, for example, via an IVR system. In a second example, the web site is configured to send a message, directly or indirectly, to the issuer, wherein the message is configured to fund and activate the card. The open card may be used at a variety of merchants. Thus, transaction instrument distribution system 100 facilitates convenient distribution of transaction instruments.

Although described as a merchant system herein, in general, distributor system 130 may be any service provider, retailer, mall, financial institution, travel agency, or other entity that performs in-person distribution of a transaction instrument. The term 'retail environment' should be construed broadly to encompass any environment where product is accessible to the public for the public's selection, such as where product is accessibly displayed on counters, shelves, display racks, and/or the like. In accordance with various exemplary embodiments of the present invention, distributor system 130 is suitably configured to offer transaction instruments to consumers in a manner whereby the consumers may physically select/obtain the transaction instrument. For example, the transaction instrument may be a card and the card may be associated with a package. In this example, the packaged card may be displayed by hanging the package on a rack display. The packaged card may also be displayed by placing the package on a display shelf, in a vending machine, or through other suitable display techniques. These exemplary methods of displaying the package facilitate selection by a consumer of the package. The consumer may then begin the process of acquiring ownership of the package, for example, by picking up the package and adding it to their shopping cart. In other exemplary embodiments, the transaction instrument is distributed without packaging.

Although the present invention contemplates the sale of transaction instruments to consumer 140, in other embodiments, transaction instruments may be distributed to merchants or consumers for free. In accordance with other aspects of the present invention, distributor system 130 may process purchases and communicate transaction information with issuer 110 upon sale of an item. For example, distributor system 130 may sell DVD's, produce, toys, food, hardware, and/or the like, and may communicate (directly or indirectly) with the issuer of a charge card, credit card, a pre-paid card, and/or the like to reconcile payment for these purchases.

In general, distributor system 130 is similarly configured to communicate with issuer system 110 in connection with the distribution of the transaction instrument. The information communicated may vary depending on the distribution technique used, the type of transaction instrument, the security systems in place, and/or the like. In one exemplary embodiment, distributor system 130 comprises hardware and/or software, such as a cash register, having a point of sale device integrated therein. Distributor system 130 may have a computing center such as a mainframe computer. However, the computing center of distributor system 130 may be implemented in other forms, such as a personal computer, a minicomputer, a PC server, a network set of computers, or the like.

The computer is suitably configured to receive input identifying the transaction instrument to be distributed. For example, the computer may be suitably configured to scan a bar code associated with the transaction instrument and receive information identifying the card being purchased. The computer may further be suitably configured to compare the identifying information to inventory recorded in a database, to receive or look up the sales price, and/or to calculate the sales price associated with the transaction instrument.

In one embodiment, for example, a third-party partner account number is scanned from the package holding a pre-paid card and the purchase price is looked up from inventory. The third-party partner account number, the purchase price of the card, and the merchant's own identification number may be communicated to the third party partner who may convert the third-party partner account number to the issuer's corresponding account number and forward this information to the issuer.

Furthermore, the merchant computer may be suitably configured to send a Fund/Init or Fund/Activate message (as defined herein) to the issuer. The Fund/Init or Fund/Activate message may be a message that requests approval of sale of the transaction instrument. The Fund/Init or Fund/Activate message may, in one embodiment, be communicated along with the account number, price, and merchant number information just described, and may also pass through the third-party partner system. The computer may also be suitably configured to receive an 'approved/authorized' message that authorizes the sale of the pre-paid card. Furthermore, the Fund/Init or Fund/Activate message may be a message that causes the transaction account to be funded upon distribution of the related transaction instrument. Moreover, the Fund/Init or Fund/Activate message may be sent, substantially in real time, i.e. at about the time of the distribution/sale of the transaction instrument. In addition, the Fund/Init message may be a message that is configured to cause the transaction account to not be activated at the time of distribution/sale of the transaction instrument. However, the Fund/Activate message may be a message that is further configured to cause the transaction account to be activated upon distribution/sale of the transaction instrument.

Figure 5:
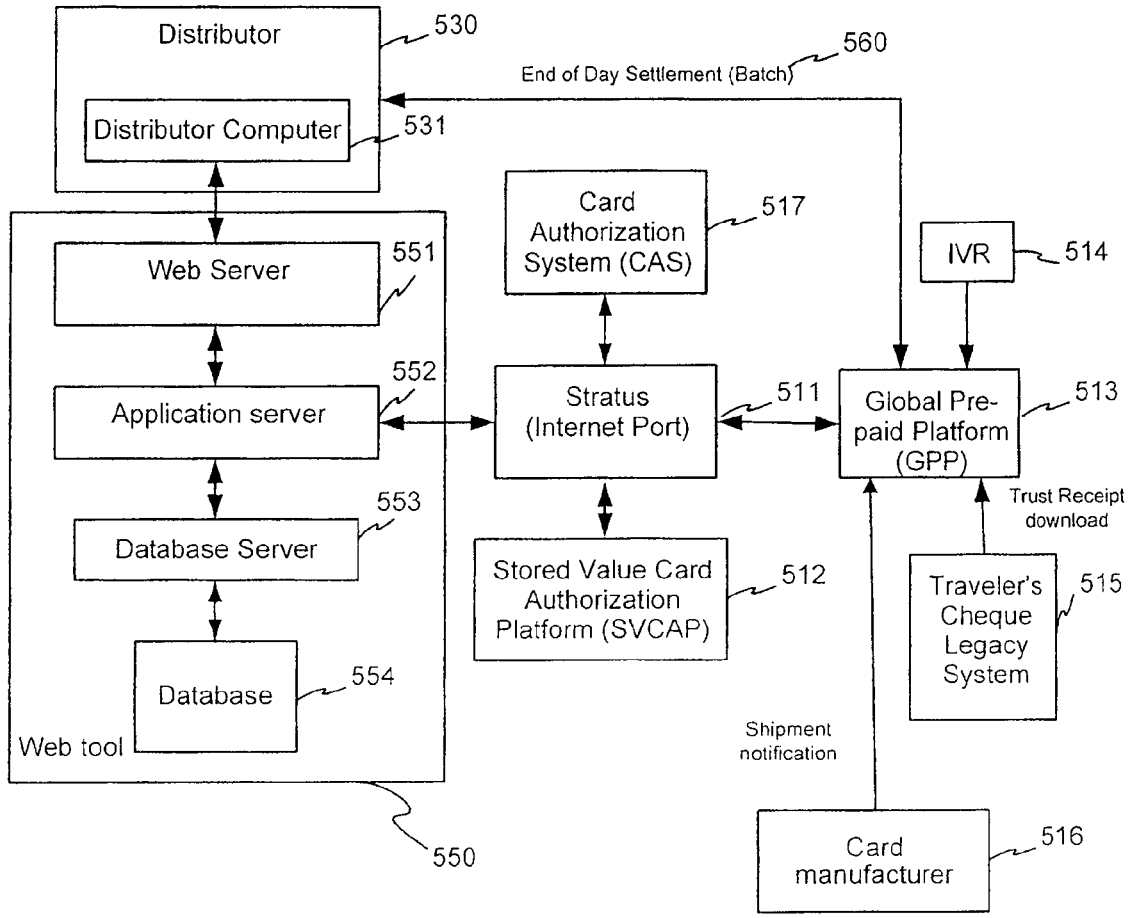
FIG. 5 illustrates a block diagram of an exemplary financial transaction instrument distribution system including an exemplary web tool.

With momentary reference to FIG. 5, a distributor computer 531, operated by distributor 530, may be configured to access a web tool 550 comprising a web server 551, an application server 552, a database server 553, and an associated database 554. Web tool 550 may be associated with issuer system 110, and configured to serve up a web page to distributor 530. Through the web page, the distributor system may be able to track inventory by card number, by serial number, by package number (such as case, sleeve, shipment number, and/or the like), and/or similar tracking methods. The distributor system may be configured to track inventory on database 554 that is fed from the issuer system database (e.g., Global Pre-paid Platform 'GPP' 513). In this embodiment, the web tool may be configured to limit sales to transaction instruments that are listed in database 554. In another exemplary embodiment, inventory may be tracked via a remote database, i.e., an issuer system database, or the like. The distributor system may further look up sales prices, calculate sales prices or commissions, send Fund/Init or fund/activate messages, and/or receive 'approved/authorized' or 'declined/deferred' messages through the issuer web page. Such messages and actions may be performed via International Standards Organization ("ISO") messaging. Furthermore, such messages and actions may be communicated utilizing the internet connectivity between the application and the issuer system. In another example, the distributor system web site may be configured to link directly to the issuer system. The computer may be located at the point of distribution of the transaction instrument. Also, the computer may be configured such that distribution information may be manually entered into fields on the web page, or automatically entered via scanning, swiping a magnetic stripe through a reader, look-up tables and/or like methods of populating fields on a web page.

Distributor system 130 may also communicate other information with issuer system 110 (directly or indirectly). In one exemplary embodiment, the information communicated includes the consumer name, an account number, a sequential number, the date of distribution of the transaction instrument, the time of distribution, the place of distribution, the type of transaction instrument distributed, and/or the like. The communicated information may be useful for the issuer and distributor to reconcile amounts owed between themselves, to track inventory, to limit fraud, to activate the transaction account, and/or to provide additional services. This other information may be sent at the time of the purchase, or as a batch process on a periodic basis. The distribution information may, for example, be communicated via batch processing (see e.g., 560 of FIG. 5) that is performed on a daily basis, in real time, and/or at some other appropriate interval. The distribution information may be communicated to issuer 110 directly in electronic format, e.g., via a web page, or indirectly in a verbal, or printed format that later is entered in electronic format into issuer system 110.

The distributor system 130 may include a computer (e.g., 531) that may be suitably configured to access a suitable website or other Internet-based graphical user interface that is accessible by users. In another example, the distributor system 130 may include a computer that may be suitably configured to access a suitable website or other Internet-based graphical user interface that is provided by issuer system 110. In one embodiment, the Internet Information Server, Microsoft Transaction Server, and Microsoft SQL Server, are used in conjunction with the Microsoft operating system, Microsoft NT web server software, a Microsoft SQL database system, and a Microsoft Commerce Server. Additionally, components such as Access or SQL Server, Oracle, Sybase, Informix MySQL, Intervase, etc., may be used to provide an ADO-compliant database management system. The term "web page" as it is used herein is not meant to limit the type of documents and applications that might be used to interact with the user. For example, a typical website might include, in addition to standard HTML documents, various forms, Java applets, Javascript, active server pages (ASP), common gateway interface scripts (CGI), extensible markup language (XML), dynamic HTML, cascading style sheets (CSS), helper applications, plug-ins, and/or the like.

Issuer system 110 may include any software, hardware, financial institution, credit card company, bank, business, and/or the like that is capable of issuing a transaction instrument. Issuer system 110 may also be suitably configured to receive a Fund/Init message, process a request for sale of a transaction instrument, and/or return an authorization/approval message. Furthermore, issuer system 110 may include an internet accessible web site configured to facilitate distribution of transaction instruments.

In accordance with exemplary embodiments, issuer system 110 may include a production system for producing physical embodiments of transaction instruments and/or for creating the associated transaction accounts. In addition, issuer system 110 may comprise systems that are configured to track inventory, receive information from distributor system 130, receive information from third-party partner system 120, identify fraud, replace lost transaction instruments, send commission payments, receive amounts owed, perform accounting, and/or the like for transaction instruments and/or associated transaction accounts.

By way of example, issuer system 110 may be a financial institution that issues a pre-paid card to distribution system 130, e.g., a merchant. For example, issuer system may consign the transaction instrument to the merchant. In this example, issuer system 110 may further pay a commission to the distributor and/or receive payment from the distributor.

In another exemplary embodiment, issuer system 110 is configured with, for example, a card authorization system, that may be suitably configured to receive a message from a point of sale device at distributor system 130. The card authorization system may be suitably modified to recognize a Fund/Init message from distributor system 130. For example, a Fund/Init message may be similar to a standard transaction message with one or more fields changed to indicate that a customer desires to acquire a particular transaction instrument. The field(s) that are changed may comprise, for example, Message Type Indicator, Processing Code, and/or Function Code. Upon recognizing the Fund/Init message, the card authorization system may be suitably configured to send a message to a processing system. For example, with reference to a stored value card, a message may be passed to a stored value card processing system (e.g., SVCAP).

The stored value processing system may comprise a logic system that can check to see if the card status is 'already sold', and/or whether the card status is 'at the merchant'. In one exemplary embodiment, the stored value processing system may query an appropriate database to check the card status. Furthermore, the stored value processing system may, upon determining that the card can be sold, (1) adjust the card status in the database to 'sold', and/or (2) send an authorization signal back, through the card authorization system, to the point of sale device.

In another exemplary embodiment, the internet accessible website (web tool) may be configured to interact with the card authorization system (e.g., 517). The web site may utilize an internet connection or dedication network connection specifically routed to the authorization network of the issuer. For example, the website may be given a specific port to access on an internet enabled Stratus box (e.g., 511) that is enabled for only that distributor application. Furthermore, other methods may suitably be used to communicate between the website and card authorization system 517. Thus, a message may be communicated from the web site to card authorization system 517 requesting authorization to distribute the transaction instrument. The card authorization system may communicate with, for example, SVCAP 512 which may determine if authorization is appropriate, adjust the status of the transaction instrument to 'sold', and send an authorization signal back, through the card authorization system to the web site. The web site may further be configured to display an 'approved/authorized' message or a 'declined/deferred' message. The web site may be further configured to fund a transaction instrument for a pre-denominated amount and/or for a variable load amount.

In one exemplary embodiment, and with momentary reference to FIG. 5, issuer system 110 may be further configured with an interactive voice response system ("IVR") 514 that may be suitably configured to receive a request from a customer to activate a purchased transaction instrument (e.g., card). The IVR may be suitably configured to check an appropriate database and determine if the status of the card is "sold". The IVR may also be configured to inform the customer, if the card status happens to be 'sold', that the card is activated and/or to activate the card. For example, the card may be activated by adjusting the status of the card in a suitable database.

In this manner, issuer system 110 may be configured to facilitate a user purchasing, for example, a pre-paid card and activating the pre-paid card right away. In one embodiment, transaction instrument distribution system 100 may be configured to facilitate activation (and thus use) of a transaction instrument within seconds after the transaction instrument is distributed (e.g., purchased). In other embodiments, the transaction instrument may be used within less than 5 minutes of the purchase. In further exemplary embodiments, the transaction instrument may be used to conclude purchases made at the time of the purchase of the transaction instrument. Also, third-party partner system 120 may provide all or a portion of the internet accessible web site described in connection with issuer system 110. In this embodiment, information transmitted through the web site from the distributor or the issuer is transmitted through the third-party intermediary.

Issuer system 110 may also include, for example, an established system for creating Travelers Cheques, for delivering the Travelers Cheques to distributors, and for tracking inventory, preventing fraud, replacing lost transaction instruments, sending commission payments, receiving amounts owed, performing accounting, and/or the like. These established Travelers Cheque infrastructures may, in accordance with one aspect of the present invention, be leveraged to perform similar functions for the distribution of transaction instruments. Although described herein as Travelers Cheque infrastructures, it should be understood that issuer system 110 may include any pre-existing inventory and financial settlement processing system, which operates using serial number logic, and that a Travelers Cheque system is merely one example of such a system. Thus, issuer system 110 may, in accordance with one aspect of the present invention, avoid the creation of new systems that facilitate this new method of distributing transaction instruments. Therefore, issuer system 110 may leverage a Travelers Cheque infrastructure to receive information received from merchant system 130 and leverage a Travelers Cheque and/or transaction account infrastructure to process the information and/or to provide other services related to the pre-paid card. For additional information related to leveraging a Travelers Cheque infrastructure, see for example, U.S. Non-Provisional patent application Ser. No. 10/707,779, filed Jan. 12, 2004, entitled "SYSTEMS, METHODS, AND DEVICES FOR SELLING TRANSACTION ACCOUNTS", which is incorporated herein by reference.

In various exemplary embodiments, issuer system 110 may distribute transaction instruments to consumers 140 using an intermediary third-party partner system 120. Third-party partner system 120 may be suitably configured to perform many of the tasks discussed with reference to issuer system 110 and/or distributor system 130. Furthermore, in this exemplary embodiment, merchant 130 may be suitably configured to send the Fund/Init message to third-party partner system 120 and to receive an approved/authorized message from partner system 120. Similarly, issuer system 110 may be suitably configured to receive a Fund/Init message from partner system 120 and to provide an approved/authorized message to partner system 120. In accordance with an exemplary embodiment, partner system 120 may also comprise a database for converting the identification number associated with the transaction instrument from a third party partner's number to the issuer's number.

As used herein, the terms "user", "end user", "consumer", "customer" or "participant" may be used interchangeably with each other, and each shall mean any person, entity, machine, hardware, software, business, issuer system, and/or distributor system. A user may acquire by gift, purchase, or the like, a transaction instrument, for example, an open pre-paid card, and may use that card at different merchants to complete a purchase. Also, each user may be equipped with a computing system to facilitate online commerce transactions. For example, the user may have a computing unit in the form of a personal computer, although other types of computing units may be used including laptops, notebooks, hand held computers, set-top boxes, and/or the like. The user computer may be in a home or business environment with access to a network. In an exemplary embodiment, access may be through the Internet through a commercially available web-browser software package.

Furthermore, the terms "business" or "merchant" may be used interchangeably with each other and shall mean any person, entity, distributor system, software and/or hardware that is a provider, broker and/or any other entity in the distribution chain of goods or services. For example, the merchant may be a grocery store, an on-line merchant, and/or the like. With regard to use of the open transaction instrument, the user may communicate with the merchant in person (e.g., at the box office), telephonically, or electronically (e.g., from a user computer via an internet). During the interaction, the merchant may offer goods and/or services to the user. The merchant may also offer the user the option of paying for the acquisition using a transaction instrument. Furthermore, the transaction instrument may be used by the merchant as a form of identification of the user. The merchant may have a computing unit implemented in the form of a computer-server, although other implementations are possible.

In general, the transaction instrument may be used for transactions much like other transaction instruments. Communication between the user and/or merchant and the system of the present invention is accomplished through any suitable communication means, such as, for example, a telephone network, Intranet, Internet, point of interaction device (point of sale device, personal digital assistant, cellular phone, kiosk, etc.), online communications, off-line communications, wireless communications, and/or the like. One skilled in the art may also appreciate that, for security reasons, any databases, systems, or components of the present invention may consist of any combination of databases or components at a single location or at multiple locations, wherein each database or system includes any of various suitable security features, such as firewalls, access codes, encryption, de-encryption, compression, decompression, and/or the like.

It may be appreciated that many applications of the present invention could be formulated. One skilled in the art may appreciate that a network may include any system for exchanging data or transacting business, such as the Internet, an intranet, an extranet, WAN, LAN, satellite communications, and/or the like. It is noted that the network may be implemented as other types of networks, such as an interactive television (ITV) network. The users may interact with the system via any input device such as a keyboard, mouse, kiosk, personal digital assistant (e.g., Palm Pilot®), handheld computer, cellular phone and/or the like. Similarly, the invention could be used in conjunction with any type of personal computer, network computer, workstation, minicomputer, mainframe, or the like running any operating system such as any version of Windows, Windows NT, Windows2000, Windows 98, Windows 95, MacOS, OS/2, BeOS, Linux, UNIX, Solaris or the like. Moreover, although the invention is frequently described herein as being implemented with TCP/IP communications protocols, it may be readily understood that the invention could also be implemented using IPX, Appletalk, IP-6, NetBIOS, OSI or any number of existing or future protocols. Moreover, the system may contemplate the use, sale or distribution of any goods, services or information over any network having similar functionality described herein.

The computing units may be connected with each other via a data communication network. The network may be a public network and assumed to be insecure and open to eavesdroppers. In the illustrated implementation, the network may be embodied as the internet. In this context, the computers may or may not be connected to the internet at all times. For instance, the customer computer may employ a modem to occasionally connect to the internet, whereas the bank computing center might maintain a permanent connection to the internet. Specific information related to the protocols, standards, and application software utilized in connection with the Internet may not be discussed herein. For further information regarding such details, see, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997). LOSHIN, TCP/IP CLEARLY EXPLAINED (1997). All of these texts are hereby incorporated by reference.

The systems may be suitably coupled to the network via data links. A variety of conventional communications media and protocols may be used for data links. For example, a connection to an Internet Service Provider (ISP) over the local loop as is typically used in connection with standard modem communication, cable modem, Dish networks, ISDN, Digital Subscriber Line (DSL), or various wireless communication methods. The merchant system might also reside within a local area network (LAN) that interfaces to the network via a leased line (T1, D3, etc.). Such communication methods are well known in the art and are covered in a variety of standard texts. See, e.g., GILBERT HELD, UNDERSTANDING DATA COMMUNICATIONS (1996), hereby incorporated by reference.

The distributor, third-party partner, and/or the issuer may be interconnected via a second network and/or a third network, each referred to as a payment network. The payment network which may be part of certain transactions represents existing proprietary networks that presently accommodate transactions for charge cards, credit cards, debit cards, and other types of financial/banking cards. The payment network is a closed network that is assumed to be secure from eavesdroppers. Exemplary transaction networks may include the American Express®, VisaNet® and the Veriphone® networks.

Any databases discussed herein may be any type of database, such as relational, hierarchical, graphical, object-oriented, and/or other database configurations. Common database products that may be used to implement the databases include DB2 by IBM (White Plains, N.Y.), various database products available from Oracle Corporation (Redwood Shores, Calif.), Microsoft Access or Microsoft SQL Server by Microsoft Corporation (Redmond, Wash.), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in pre-selected databases or data sectors.

More particularly, a "key field" partitions the database according to the high-level class of objects defined by the key field. For example, certain types of data may be designated as a key field in a plurality of related data tables and the data tables may then be linked on the basis of the type of data in the key field. In this regard, the data corresponding to the key field in each of the linked data tables is preferably the same or of the same type. However, data tables having similar, though not identical, data in the key fields may also be linked by using AGREP, for example. In accordance with one aspect of the present invention, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); block of binary (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a Block of Binary (BLOB). Thus, any binary information may be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the financial transaction instrument by multiple and unrelated owners of the data sets. For example, a first data set which may be stored may be provided by a first issuer, a second data set which may be stored may be provided by an unrelated second issuer, and yet a third data set which may be stored, may be provided by an third issuer unrelated to the first and second issuer. Each of these three exemplary data sets may contain different information that is stored using different data storage formats and/or techniques. Further, each data set may contain subsets of data which also may be distinct from other subsets.

As stated above, in various embodiments of the present invention, the data may be stored without regard to a common format. However, in one exemplary embodiment of the present invention, the data set (e.g., BLOB) may be annotated in a standard manner when provided for manipulating the data onto the financial transaction instrument. The annotation may comprise a short header, trailer, or other appropriate indicator related to each data set that is suitably configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be suitably configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be suitably configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified merchants are permitted to access the data set for reading, and others are altogether excluded from accessing the data set. However, other access restriction parameters may also be used allowing various entities to access a data set with various permission levels as appropriate.

The data, including the header or trailer may be received by a stand alone interaction device suitably configured to add, delete, modify, or augment the data in accordance with the header or trailer. As such, in one preferred embodiment, the header or trailer is not stored on the transaction instrument along with the associated issuer-owned data but instead the appropriate action may be taken by providing to the transaction instrument user at the stand alone device, the appropriate option for the action to be taken. However, the present invention contemplates a data storage arrangement wherein the header or trailer, or header or trailer history, of the data is stored on the transaction instrument in relation to the appropriate data.

One skilled in the art will also appreciate that, for security reasons, any databases, systems, devices, servers or other components of the present invention may consist of any combination thereof at a single location or at multiple locations, wherein each database or system includes any of various suitable security features, such as firewalls, access codes, encryption, decryption, compression, decompression, and/or the like.

Figure 2:
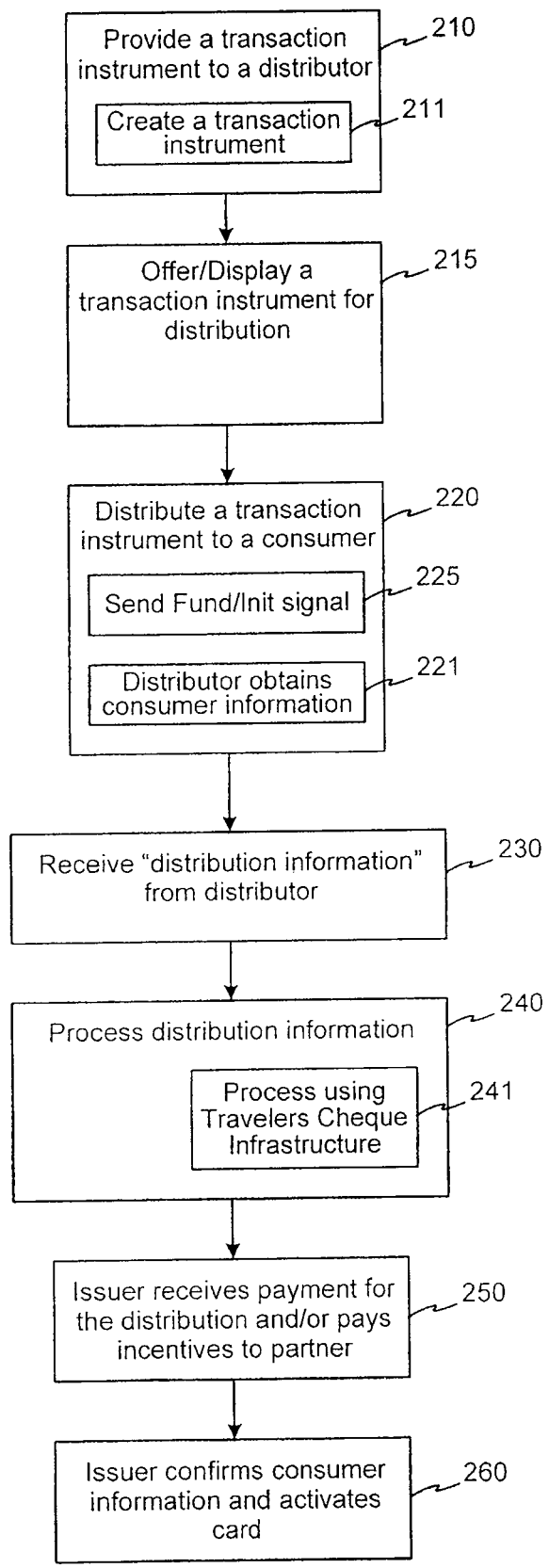
FIG. 2 illustrates a flow diagram showing an exemplary transaction instrument distribution method.

The foregoing system components may be suitably configured for performing the following method which may facilitate the distribution of a transaction instrument. With reference to FIG. 2, an exemplary method 200 may comprise one or more of the following steps: providing a transaction instrument to a distributor (step 210), offering the transaction instrument (e.g., at a retail establishment) (step 215), distributing the transaction instrument to customers (step 220), sending a Fund/Init message (step 225), sending distribution information to the issuer (step 230), and/or processing the distribution information via, for example, a Travelers Cheque infrastructure (step 240).

In accordance with various exemplary embodiments of the present invention, providing the transaction instrument to a distributor (step 210) may include the step of creating the transaction instrument (step 211). Creation of the transaction instrument may include both electronic and physical activities. For example, a card may be created physically and/or the related account created electronically. The transaction account may be created electronically by, for example, creating an account number that is associated with the transaction instrument. The account number may be, for example, a credit card number or other number as described herein. For security reasons, the account number may be a random number and/or the account number may also include routing information prior to the random number. The account number may be associated with other account specific information in a database, look up table and/or the like. For example, in a stored value account, the account may be suitably configured to be worth a particular number of minutes, a pre-determined value, a specific reward, and/or the like.

In addition to the account number, a serial number or any other identifier may be associated with the transaction instrument and/or transaction account. In accordance with various exemplary embodiments, the serial number is a sequential number. The sequential number may, among other things, facilitate the tracking of inventory.

With regard to transaction instruments involving a physical transaction instrument, the financial transaction instrument may comprise, for example, a magnetic stripe card, smart card, bar code card, transponder, and/or the like. Issuer system 110 may provide a card account number and a serial number to a manufacturer that produces the physical transaction instrument, encodes the instrument, and/or packaging for the transaction instrument. The manufacturer may create, for example, a card. The manufacturer may further package the card by inserting the card into an envelope.

The packaged transaction instruments may be shipped to third-party partner systems 120 and/or distribution centers which may provide the packaged transaction instruments to distributor system 130. Providing the transaction instrument (step 210), in one exemplary embodiment, includes consigning the transaction instrument to the distributor. For example, upon delivery, a distributor may sign a receipt acknowledging responsibility for the delivered set of pre-paid cards which may be individually identified on the receipt. This receipt may be mailed, faxed, or electronically transmitted to the issuer to confirm receipt of the pre-paid cards. In other exemplary embodiments, providing the transaction instrument includes selling the transaction instrument (or the right to distribute the same) to the distributor. One skilled in the art will appreciate that the distribution centers may not be necessary. For example, the transaction instruments may be distributed directly to consumers. The distributor may acknowledge receipt of the transaction instruments and perform other inventory related actions via the web site.

In accordance with one embodiment of the present invention, an inventory system associated with issuer 110 (e.g., GPP 513, FIG. 5) may be configured to create an inventory load file. The inventory load file may comprise fields of information such as: selling outlet number, denomination, serial number, trust receipt number, ship date of inventory, merchant identification, card number, card type (indicator of co-branding, design, and product type), card currency, bundle, sleeve, case, future use fields, and/or the like. The inventory load file may, for example, be created when card manufacturer 516 sends GPP 513 notification of shipment of the pre-paid cards. Furthermore, the inventory load file may be created by an existing inventory system, e.g., a Traveler's Cheque system 515, thus leveraging pre-existing inventory systems. The existing inventory system 515 may send communicate a trust receipt to GPP 513. GPP 513 may then communicate the inventory load file to the web tool 550. For example, web tool 550, specifically application server 552, may be configured to check with the issuer system to see if an inventory load file is ready to be downloaded (e.g., from Stratus 511), and may download any waiting inventory load file. In one embodiment, the load file is stored, by database server 553, in a database 554 associated with web tool 550. The inventory load file facilitates tracking inventory by serial number.

In addition, financial transaction instrument distribution system 100 may be configured to facilitate transfer of inventory between retail locations within a merchant. The merchant may create a distribution hierarchy. With permission from at least one level up on the hierarchy, for example, inventory may be re-assigned, transferred, or deleted. Thus, the web tool 550 may be configured to assign inventory in the inventory load file to various sub-locations within the merchant and or facilitate transferring the inventory amongst the sub-locations. The web page may further be configured to generate reports for actions such as stock deletion (e.g., for lost cards) and to create destruction certificates.

The distributor may offer (step 215) the transaction instrument to consumers using various techniques. For example, physical devices associated with the transaction instruments may be stored behind a counter or otherwise kept inaccessible to customers except through the merchant's assistance. In another example, a merchant may hang packaged pre-paid open cards on a rack near a check out counter. Similarly, pre-paid open cards may be displayed on a shelf, or other suitable display device. Thus, offering the transaction instrument in a consumer accessible manner comprises any method of making physically accessible to a consumer the acquisition of a transaction instrument. For example, a physical package or card is displayed within reach of a customer. Thus, a customer may select (i.e., physically acquire), for example, a pre-denominated open card from a rack of cards, and proceed to purchase the card along with other groceries or products selected by the consumer. In one embodiment, the account number or cards may be distributed via a kiosk, computer terminal, ATM (e.g., on an ATM receipt) or over the phone. For additional information related to distribution of an account number, see for example, U.S. Ser. No. 08/456,525 filed on Jun. 1, 1995 by inventor John M. Taskett and entitled METHODS AND APPARATUS FOR PROVIDING A PRE-PAID, REMOTE ENTRY CUSTOMER ACCOUNT, which is hereby incorporated by reference.

The distributor may distribute the transaction instrument (step 220) using various techniques. For example, the distributor may sell the transaction instrument to customer 140. However, the distributor may give the transaction instrument to a customer for free or even entice a customer to obtain the transaction instrument in exchange for value. For example, a merchant might offer incentives, such as T-shirts, low interest rates, or other rewards with each credit card that is distributed to customer 140. Other techniques for distributing the transaction instrument may also be used.

Distributing the transaction instrument (step 220) may further comprise the step of obtaining an identification number from the package and/or transaction instrument. The identification number may identify or relate to the associated transaction account of the transaction instrument that is being purchased or the transaction instrument itself. In one exemplary embodiment, the identity of the transaction instrument may be acquired and used to populate an appropriate field of a web page. For example, the identification number may be a serial number that is manually read off the package or card and typed in by hand, or that is machine read from a bar code or magnetic stripe on the package or the card. The serial number may be compared to a database containing inventory information. The database may be locally located with the Merchant, or may be accessed via the web page at the issuer system 110. In the web site embodiment, the identified transaction account/instrument may be compared to an issuer database. Furthermore, the issuer database may include distribution information including the identity of the distributor or merchant responsible for distributing the identified transaction instrument, the identity of the merchant's employee or location responsible for that transaction instrument, and/or the like. In one example, the issuer database may reflect that a particular "till" has been assigned to Employee #3 and has 5 pre-paid cards remaining for distribution. However, this and other inventory information may be stored in the web site database. The issuer database may further include the type of account (e.g., pre-paid, brand, and/or the like), the stored value of the account, commission information, and/or similar information related to the transaction account specifically or generally. It may thus be determined that, for example, a $25 gift card is being presented for purchase. In one embodiment, the database may return a price to charge for the selected card, e.g., $27.95.

Distributing the transaction instrument (step 220) may additionally include the step of sending a Fund/Init message to issuer system 110, for example, upon purchase of the transaction instrument (step 225). The Fund/Init message may include information that causes issuer system to recognize the message as representing a request to sell a selected transaction instrument. Issuer system 110 may process the request, and if appropriate, send an approved/authorized message to distributor system 130. Issuer system 110 may also update its database(s) to note that the specified transaction instrument is sold. Issuer system may also update its database (s) to note that the transaction account associated with the specified transaction instrument is funded. Distributing the transaction instrument (step 220) may additionally include the steps of receiving the approved/authorized message, and transferring ownership of the transaction instrument to the consumer. However, at this time, the transaction account associated with the purchased transaction instrument may be funded but not activated.

The Fund/Init message, or any similar message, may be sent from the web page to the issuer system. For example, the merchant may send a request for authorization via the web page. The request may be processed (step 240, below) and an 'approved/authorized' message from the issuer system 110 may be displayed on the web site. In a further example, the web site may be configured to receive information regarding the financial vehicle used to purchase the transaction instrument. In other words, the web site may receive information on whether cash, charge card, credit card, stored value card, loyalty card, and/or like financial devices were used to consummate the transaction. Furthermore, in some embodiments, the credit card or like instrument may be identified generally or specifically by swiping the magnetic stripe, scanning a bar code, or typing in the number manually. The web page may be configured to forward to issuer system 110 the information relevant to the financial device that was used in purchasing the transaction instrument.

Moreover, in various exemplary embodiments, the website is configured to consummate the transaction. For example, the web based interface may be configured to communicate with a payment processor via the internet to enable payment of the account. Thus, the web based interface may be configured to both distribute and sell the transaction instrument.

In some exemplary embodiments involving a third-party partner, the primary contact with the merchant is through the third-party partner. Thus, the merchant system is suitably configured, in this case, to send a Fund/Init message to third-party partner system 120. Third-party partner system 120, in turn recognizes the message as a request to distribute a transaction instrument, and translates the serial number (accompanying or included in the Fund/Init message) to a corresponding issuer serial number, which is forwarded to issuer system 110 as a Fund/Init message. Approval/authorization of the distribution of the transaction instrument is similarly sent to third-party partner system 120 to be converted and/or conveyed back to merchant system 130.

The direct, or indirect, distribution of the transaction instrument may further involve the distributor collecting information from the customer (step 221). The customer information may include, for example, the customer name, password, social security number, birth date, survey information, loyalty program information and other personal identification information, and/or the like. Such information may be combined with other information related to the distribution of the transaction instrument such as, for example, the place and date of sale of the transaction instrument, the 'value' associated with a pre-paid card, and/or the like. All or any portion of this combined information ("distribution information") may be communicated to the issuer system (step 230). All, or a portion, of this distribution information may be input manually or automatically into fields of the web page. The web based application may be configured to communicate this transaction instrument distribution information to issuer system 110.

In various exemplary embodiments, the distribution information is transmitted to the issuer system and it may be associated with a serial number and/or account number. Again, this distribution information may, in some embodiments, be communicated to issuer system 110 via the web based interface. In one exemplary embodiment, the serial number comprises at least a portion of a machine readable code, such as a bar code. In another example, the serial number may be stored in a magnetic stripe encoded format. The web application at distributor system 130 may be suitably configured to recognize the codes and, based on the codes, to determine the amount that the distributor owes to the issuer. In other exemplary embodiments, the serial number may be entered into an electronic system manually or by other means (bar code, machine readable code, etc.) (step 232). For example, an internet web page based system may be suitably configured with fields for manual or automatic entry of a serial number as well as other information comprising the distribution information. The fields may, for example, be similar to fields used in connection with distributing Travelers Cheques; however, other formats may also be used. The American Express "Express Check" software is one example of such a system. Moreover, the internet web page may be suitably configured to transmit/communicate distribution information to an issuer in other suitable formats.

The distribution information may be stored and transmitted in batches, or transmitted in substantially real time. A batch transmission (e.g., 560) of distribution information may, for example, include several transactions including various products, individual transaction information, and/or summary information. For example, a single batch transmission may comprise the transmission of a file containing a summary of amounts the distributor owes to the issuer, the total number of pre-paid cards sold, and distribution information specifying the serial number of the sold pre-paid cards. In another exemplary embodiment, the distribution information is communicated to issuer system 110 via the internet or other suitable communication systems. The issuer receives the distribution information and may process the information (step 240).

Processing of the distribution information may take place through a combination of systems that may already be established at issuer system 110. For example, issuer system 110 may comprise both a Travelers Cheque infrastructure (or the like) and a transaction account infrastructure (e.g., a pre-paid card infrastructure). The Travelers Cheque infrastructure, or more generally, the pre-existing inventory and financial settlement processing system, may be suitably configured to receive and process the distribution information and to transmit data to the transaction account infrastructure. For example, a Travelers Cheque infrastructure may share inventory management and seller data with a pre-paid card infrastructure. Thus, financial transaction instrument distribution system 100 may be suitably configured to leverage the functions and services of pre-existing Travelers Cheque, ATM, POS and transaction account infrastructures by receiving communications through a Travelers Cheque, POS and/or ATM communication system and sharing information between the two infrastructures.

The web site may be further configured to facilitate preparing reports for the merchant. For example, a report may summarize the days transactions, a month's transactions, and/or the like. As another example, the web page may be configured to create a report that delineates fees on a product from the face value on the transaction instrument. The web site may also be configured to automatically total the final price, for example, by adding the fees and the face value. Furthermore, the web site may facilitate a flexible fee configuration where various fees may apply depending on the distributor, the buyer, and/or other factors.

The web site may further be configured to facilitate reconciliation. For example, the website may be configured to display a 'shift reconciliation' screen which is configured for receive a clerk's physical counts of payment methods taken in. The web site may be further configured to utilize that entry to calculate over/short of the till based on the transactions (sale, refund, etc) done during the shift. The web site may further be configured to produce a report containing this information, and this report may be provided to a third-party accounting systems or utilized in hard copy format. The web site may also be configured to provide a receipt for the merchant, the customer, or both. For example, the web site may be configured to create a printed receipt. In other embodiments, the web site may permit balance inquiry functionality, voiding of a fund or fund/activate if the transaction has not been settled, and/or cash out of a card having a remaining balance. Each of these transactions may, for example, utilize processes similar to those described above with regard to the Fund/Init message. In one exemplary embodiment, a message is transmitted that requests that action to be taken (e.g., balance inquiry, void, and/or the like). The issuer authorization system may send a response message to the distributor system returning the results (e.g., account balance, an approval/decline message, and/or the like). Furthermore, network connectivity and website technology similar to that described herein may be used to achieve this functionality. In one example, the web site may be configured to make such functionality available for only certain product types, users, etc. In another embodiment, the web site may be configured to facilitate tracking of inventory between distribution locations and between sales clerks. The processing step may further include checking to see if the conditions of the transaction would trigger money laundering laws.

In accordance with one exemplary embodiment of the present invention, issuer system 110 may be suitably configured to leverage a Travelers Cheque, POS, ATM or other financial infrastructure to process the distribution information and/or to provide services related to the transaction account/instrument. For example, through the Travelers Cheque infrastructure, issuer system 110 may be suitably configured to pay the distributor a commission for the distribution of the transaction instrument (step 250). In accordance with one exemplary embodiment of the present invention, the commission payment system may be similar to that used in paying commissions for sales of Travelers Cheques, although other systems may also be used.

In accordance with yet another exemplary embodiment of the present invention, issuer system 110 may be suitably configured to activate the transaction instrument (step 260). In one exemplary embodiment, the transaction instrument may be activated at the point of sale. For example, the web site application may be configured to send a Fund/Activate message to the issuer (directly or indirectly), which may cause the transaction account, associated with the transaction instrument, to be activated. In another exemplary embodiment, the transaction account may be activated some time after the distribution/sale. For example, the web site application may be configured to send a Fund/Init message to the issuer (directly or indirectly).

The purchaser of a pre-paid card, for example, may call a customer service representative or an interactive voice response system associated with a pre-paid card infrastructure to activate the pre-paid card. In one exemplary embodiment, if the transaction instrument has been flagged as "sold", the IVR system is suitably configured to honor a request to immediately activate the transaction account. Thus, a newly purchased open pre-paid card may be used sooner, encouraging consumers to purchase the cards.

In other exemplary embodiments, the Travelers Cheque/transaction account infrastructure(s) may be suitably configured to verify that activation is appropriate. For example, the infrastructure may be suitably configured to verify that this particular card has been sold. Furthermore, the purchaser may be asked to provide the card number, their date of birth, the last four digits of their social security number, and/or the like for the purposes of confirming that activation is appropriate. The infrastructure may further be suitably configured to detect fraud (e.g., detect an attempt to use a card that has not yet been sold), to refund or replace a lost transaction instrument, to track product inventory, to know when and how much to pay sellers as a commission, and to collect from sellers for the consignment sale. For example, if customer 140 reports a transaction instrument as lost or stolen, the issuer may determine if that transaction instrument was sold, where it was sold, etc. and thereby ask the customers questions to determine if the customer is entitled to a refund.

Figure 4:
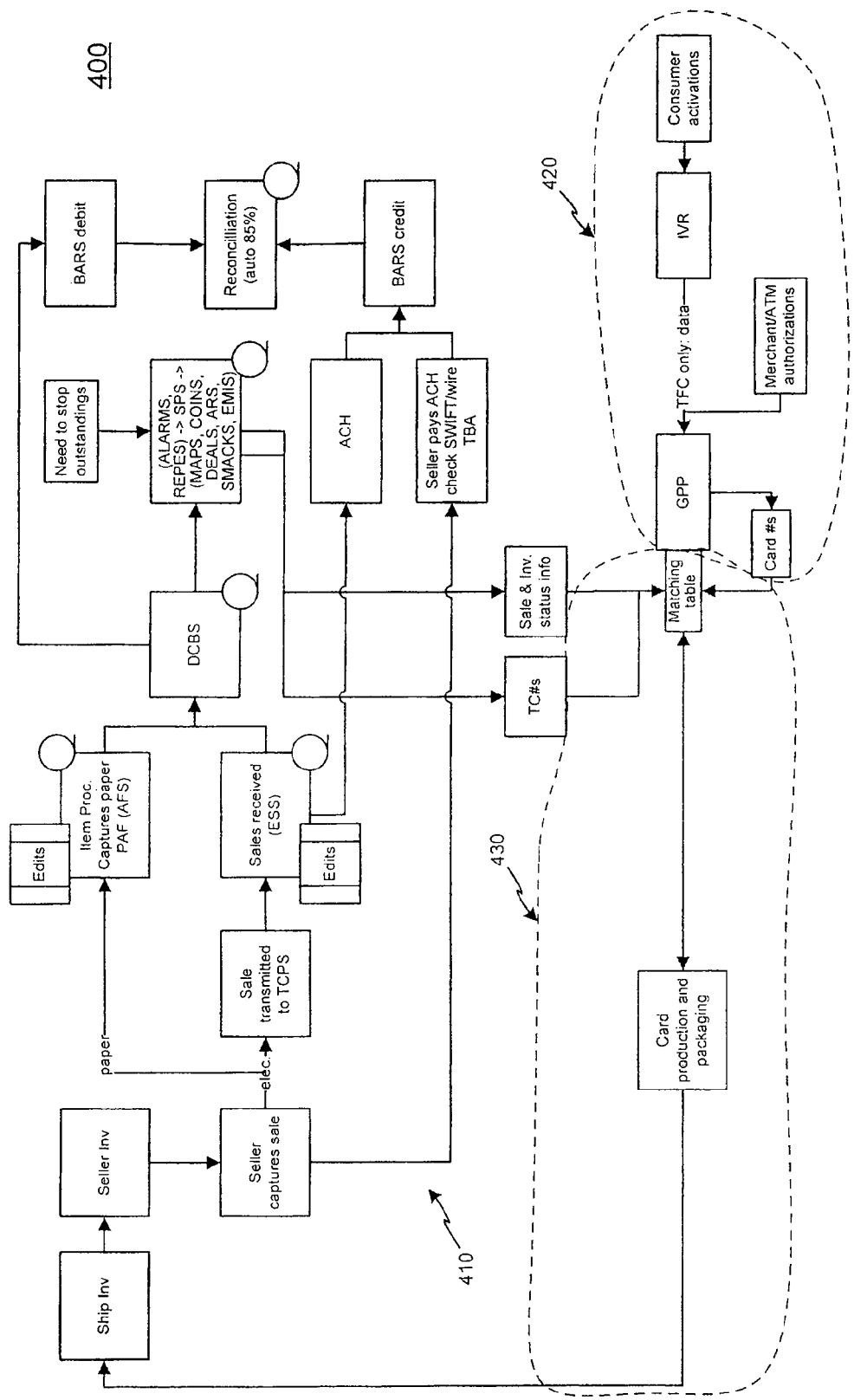
FIG. 4 illustrates a block diagram overview of an exemplary Travelers Cheque infrastructure and an exemplary transaction card infrastructure.

FIG. 4 illustrates an exemplary system 400 that is suitably configured to facilitate the distribution of a transaction instrument. System 400 combines an exemplary Travelers Cheque infrastructure 410 and an exemplary transaction account infrastructure 420. Various Travelers Cheque infrastructures and transaction card infrastructures may be used in system 400, and therefore the details of infrastructures 410 and 420 are not explained in detail. In one exemplary embodiment, transaction account infrastructure 420 may be a pre-paid card infrastructure suitably configured with an interactive voice response system facilitating consumer activation. Transaction account system 420 may be suitably configured to provide card numbers to a matching table and to communicate with the matching table, providing new functionality 430. Travelers Cheque infrastructure 410 may be suitably configured to provide Travelers Cheque numbers and/or sales and inventory status information to a matching table. Thus, the matching table may facilitate card production and packaging. The newly produced inventory may then be passed to an inventory shipping process within Travelers Cheque infrastructure 410 and infrastructure 410 may, for example, facilitate the distribution of the pre-paid cards. Various other links and communication of information between infrastructures 410 and 420 may also be used to facilitate distribution of transaction instruments.

From the issuer's perspective, in accordance with various aspects of the present invention, an issuer is able to facilitate the distribution of transaction instruments. The issuer creates the transaction instruments, issues the transaction instruments to a distributor, receives information back from the distributor upon distribution of the transaction instrument, and processes the information received. The information may conveniently be communicated via a web page accessible by the distributor. The issuer funds the transaction account upon sale, and activates the transaction account via, for example, an IVR system. In one exemplary embodiment, the information is received by the issuer's Travelers Cheque infrastructure and processed by the issuer's Travelers Cheque and/or transaction account infrastructure(s). Thus, the issuer leverages one or more existing systems to distribute transaction instruments.

From the distributor's perspective, in accordance with another aspect of the present invention, a distributor may distribute a transaction instrument using existing systems and sales techniques that are typically used to distribute merchandize in stores. For example, the distributor may receive a shipment of a box of pre-paid open type cards, each in an package that facilitates presenting the pre-paid cards. The packages may each contain, for example, a pre-paid card, and each envelope may bear identifying indicia, such as a serial number. The serial number may facilitate, for example, tracking of inventory.

The distributor may place the pre-paid cards on a shelf, on a rack, or similar display, and allow customers to self select desired products. If the customer selects a gift card from the rack and presents it for purchase, the distributor may obtain customer information and may scan the package using the same optical scanner that is typically used for reading UPC codes to scan in the sale of other products. Such transaction instrument distribution information may be entered into a web page in an automated manner or manually. The distributor may utilize a computer that can access the internet, and in one embodiment that can communicate with the issuer via an issuer web site. The distributor's computer is suitably configured to send a Fund/Init message to the issuer, and receive back an authorization. In various exemplary embodiments of the present invention the distributor receives payment for the transaction. In this example, the pre-paid card is given to customer 140 in connection with the transaction. Distribution information may be batch transmitted, for example, at the end of the day. Thus, with minimal additional processes or investment in technology, the distributor may earn commissions or realize other incentives for distribution of additional product, e.g., a pre-paid card.

From the customer's perspective, in accordance with yet another aspect of the present invention, a customer obtains the benefit and convenience of obtaining a pre-paid open card through, for example, a retail mall merchant. The transaction instrument, e.g., prepaid card, may be displayed in a customer accessible manner. For example, a customer accessible manner may comprise any method of displaying a transaction instrument (e.g. pre-paid card) where the customer can physically select the transaction instrument or a device representing the same. The customer could also, however, obtain the pre-paid card in-person, over the telephone, on line, and/or the like. For example, a customer may enter a hardware store to purchase a product. At the check out stand, the customer sees a pre-paid card of a specific denomination and adds that to the items to be purchased. The customer may optionally provide information, then pay for the pre-paid card. The customer may then activate the card by calling a number on the card. During activation, the customer may provide the purchase location or other identifying information. Thus, the customer could use the card within minutes of purchasing the card. Furthermore, in other embodiments, the card may be activated at the time of its sale, and the customer may begin using the card immediately.

An exemplary pre-paid card is the Gift Card by American Express. This product allows someone to load, for example, $25, $50, $100, or $500 onto a card and then give it to the gift recipient. The gift recipient may then buy merchandise on the card at any retailer or restaurant that accepts American Express. This exemplary Gift Card facilitates giving a gift that may be used at millions of merchants in contrast to a single store gift certificate/card, which has limited use. This system could be also be used with providers other than American Express and on various financial instruments. Other exemplary cards may include a 'mall card' that is valid for use in stores associated with a particular mall, association of malls, chain of affiliated stores, or a subset thereof. Furthermore, in one exemplary embodiment, the web-based interface is configured to facilitate loading a variable amount onto the card.

Figure 3:
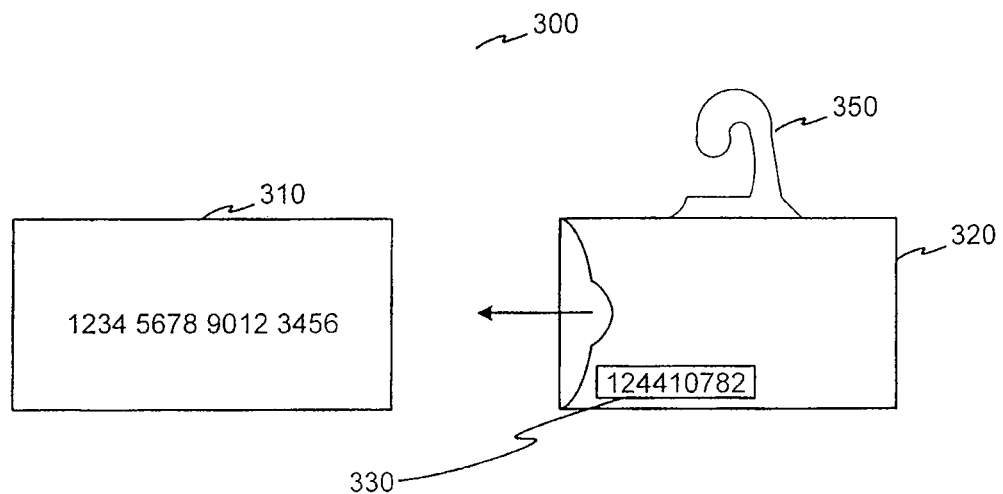
FIG. 3 illustrates an exemplary financial transaction instrument.

With reference now to FIG. 3, an exemplary transaction instrument distribution device 300 is suitably configured to facilitate distribution of a card or an account number by a distributor. Transaction instrument distribution device 300 may include a card 310 and a package 320. As discussed above, the "card" may simply be an account number, or an account number printed or encoded on any medium. Package 320, in accordance with exemplary embodiments, may be associated with card 310 when issued to the distributor.

Card 310 may include one or more physical devices used in carrying out various financial transactions. For example, card 310 may comprise a pre-paid card, rewards card, telephone card, smart card, magnetic stripe card, radio frequency card and/or the like. In yet another exemplary embodiment of the present invention, card 310 may be an electronic coupon, voucher, speed pass, and/or other such instrument. Card 310 may be used to pay for acquisitions, obtain access, provide identification, pay an amount, receive payment, redeem reward points and/or the like.

Card 310 may be associated with an account number/card number. Furthermore, an "account number", "card number", "code", "identifier" or "loyalty number", as used herein, includes any device, code, or other identifier/indicia suitably configured to allow the consumer to interact or communicate with the system, such as, for example, authorization/access code, personal identification number (PIN), Internet code, other identification code, and/or the like that is optionally located on a rewards card, pre-paid card, telephone card, smart card, magnetic stripe card, bar code card, radio frequency card and/or the like. The account number may be distributed and stored in any form of plastic, electronic, magnetic, radio frequency, audio and/or optical device capable of transmitting or downloading data from itself to a second device.

An account number may be, for example, a sixteen-digit card number, although each card provider has its own numbering system, such as the fifteen-digit numbering system used by an exemplary loyalty system. Each company's card numbers comply with that company's standardized format such that the company using a sixteen-digit format may generally use four spaced sets of numbers, as represented by the number "0000 0000 0000 0000". The first five to seven digits are reserved for processing purposes and identify the issuing bank, card type and etc. In this example, the sixteenth digit is used as a sum check for the sixteen-digit number. The intermediary eight-to-ten digits are used to uniquely identify the customer. In addition, loyalty account numbers of various types may be used.

In accordance with various exemplary embodiments of the present invention, serial number 330 is suitably configured to be a Travelers Cheque type number or a portion thereof. Thus, the serial number may be used in a system that otherwise is suitably configured for the sale of Travelers Cheques. Thus, the serialized number may be machine read from the surface of, for example, package 320, and distribution information may be conveyed to issuing system 110.

Package 320 may comprise any suitable device that facilitates accessibly offering the transaction instrument to a consumer. For example, package 320 may simply comprise a peel off hook 350 attached to a card or an envelope. Furthermore, package 320 may comprise an envelope that wholly or partially surrounds a transaction instrument, such as a card. In one embodiment, package 320 conceals the account number associated with transaction instrument 310. In further embodiments, package 320 may comprise one or more windows for viewing or reading a bar code or magnetic strip on a card without the need to remove the card from the envelope. Moreover, the revealed portion may include or correspond to the serial number. Thus, the card may be packaged in a manner that the serial number is exposed and/or readable even when the card is packaged. As illustrated in FIG. 3, in one exemplary embodiment, package 320 may also have indicia, e.g., a serial number, in the form of a bar code or magnetic strip, on the package itself. With regard to embodiments lacking a physical instrument, package 130 may be associated with a transaction account, for example, by providing a tangible object containing a transaction account number.

It is noted that the serial number may be the identification number of the third-party partner or of the issuer. In one embodiment, the various processes may include a user facilitating the input of information into a computer system. The information may be inputted via keypad, magnetic stripe, smart card, electronic pointer, touch pad and/or the like, into a user computer, POS terminal, kiosk, and/or ATM terminal. The information may be transmitted via any network.

In accordance with various exemplary embodiments of the invention, a reverse inventory management system is configured to 'locate' a group of financial transaction instruments after at least one of the financial transaction instruments in that group has been sold. Although primarily described herein in terms of financial transaction instruments, and more particularly in terms of financial transaction cards ("cards"), the description herein is equally applicable to other financial transaction instruments and to account numbers associated with financial transaction accounts.

In this regard, a retail sale or retail distribution refers to the distribution to the end user of the financial transaction instrument as opposed to the distribution or transfer of the financial transaction instrument down through the distribution chain (e.g., from the issuer down to the distributor who provides the financial transaction instrument to the end user). In addition, a distributor may have sub-entities to which financial transaction instruments are distributed and who may distribute the cards. For example, inventory may be assigned, in bundles, to various clerks, kiosks, departments, and/or like entities within a mall or department store.

As mentioned above, distributor system 130 may communicate information with issuer system 110 (directly or indirectly). In one exemplary embodiment, the information communicated includes the consumer name, an account number, a sequential number, the date of distribution of the transaction instrument, the time of distribution, the place of distribution, the name of the sales clerk, the entity responsible for the distribution, the type of transaction instrument distributed, and/or the like. The communicated information may be useful for reverse tracking of inventory as described further herein.

In general, an exemplary method comprises the steps of producing the cards, grouping a number of cards, associating the cards with each other and/or the group, keeping the card group together during the process of distributing the card groups to the merchants, distributing at least one of the cards in the card group, and recording in inventory the location of the remaining cards of that group after a card in that group is first distributed.

Figure 6:
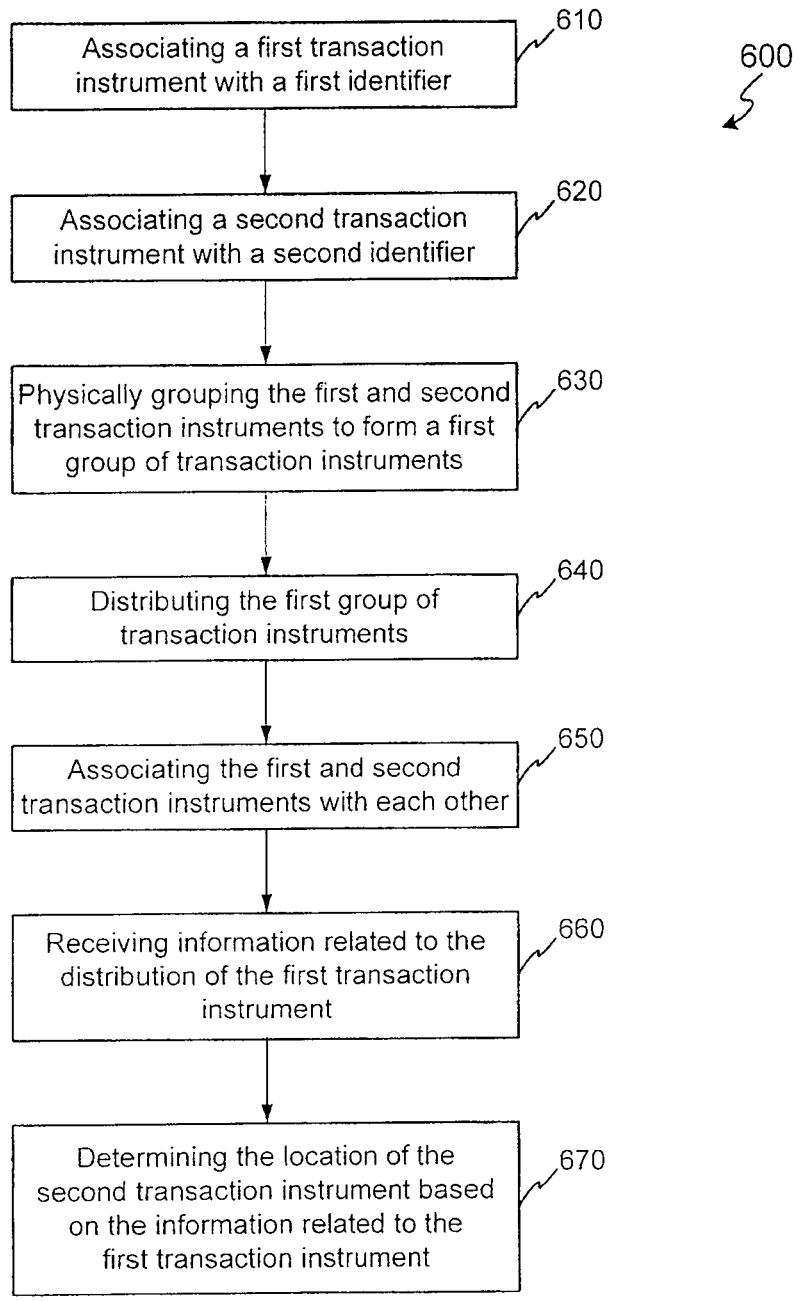
FIG. 6 illustrates a flow diagram showing an exemplary reverse inventory method.

In accordance with another exemplary embodiment, and with reference to FIG. 6, a reverse inventory method 600 may comprise the steps of producing financial transaction instruments, physically grouping more than one financial transaction instruments (step 630), distributing the group of financial transaction instruments (step 640), associating the grouped financial transaction instruments with each other (step 650), receiving information related to the distribution of a financial transaction instrument (step 660), and determining the location of other financial transaction instruments that are in the same group as the financial transaction instrument that was distributed (step 670).

Distribution of financial transaction instruments includes the distribution of account numbers, which are associated with financial transaction accounts. For example, an account number may be written on a paper that is distributed and later purchased. Although the invention contemplates all forms of distribution of financial transaction instruments and account numbers, for simplicity, an exemplary embodiment of the invention is described herein in terms of a distribution of a pre-paid card or a credit/charge card (a "card").

The issuer of a card may produce the card and/or packaging associated with the card. This may be accomplished, for example, through third-party production vendors (e.g., Oberthur Card Systems). The cards may be individually packaged, although in other embodiments, one, two, or more cards may be packaged for retail sale together ('retail sale package'). However, in various exemplary embodiments, the retail sale package comprises just the card itself. In one exemplary embodiment, a card may be placed in a cardboard or plastic container that is configured to securely hold the card and/or conceal all or portions of the card. In other embodiments, a hook may be removeably attached to the card. Furthermore, many other packaging methods may be used to prepare the cards for distribution.

Similarly, other types of financial transaction instruments may be suitably packaged for retail sale. For example, an account number associated with a financial transaction account may, for example, be printed on a paper or other object that is packaged for retail sale. As described in greater detail herein, the financial transaction instruments and/or retail packages may be associated with identifiers (steps 610 and 620). This association may be partially or completely produced by the production vendor, the issuer system, and/or both systems working together.

The individual retail sales package is configured to be uniquely identifiable. Thus, a unique identifier is associated with each retail sales package. The unique identifier may be formed of numbers, letters, symbols, and/or the like. In other exemplary embodiments, the unique identifier is a serial number. For example, the serial numbers may be sequential numbers within each distribution group of individual retail sales packages. However, it is noted that in some embodiments, the unique identifier may be a random number associated with the retail sales package. Typically, the unique identifier is a separate identifier from the account number associated with the financial transaction account, financial transaction instrument, or debit/credit card. However, in one embodiment, the unique identifier is the account number.

For simplicity, the unique identifier is described herein as being associated with the card. However, the unique identifier may be associated with at least one of the individual retail sales package, with the card, or other packaged object. Furthermore, the unique identifier (or any other identifier discussed herein) may be in the form of a printed indicia, bar code, electronic identifier (e.g., on a smart card, coded in a transponder), stored on a magnetic stripe, and/or the like. In other embodiments, the unique identifier is printed on the card or package. In accordance with another exemplary embodiment of the invention, a unique group identifier may be associated with each distribution group (as described herein).

In one exemplary embodiment, the cards are each configured to have a serial number. For example, the cards may have a serial number printed on the surface of the card. In another example, the serial number may be incorporated into the magnetic stripe or stored in a machine readable manner on the card. Furthermore, the serial number may be a sequential number such as, for example, Traveler's Cheque numbers. The unique identifier, account number, unique group identifier, number of cards in the group, and/or like information may be stored in a database, look up table, and or the like.

In accordance with one exemplary embodiment of the invention, the individual retail sale package is grouped together with other individual retail sale packages. The groups (or bundles) may comprise two or more packages. Although any number of individual retail sale packages may comprise a group of cards, in one embodiment, 25 individual retail sale packages are packaged together to form a group ("distribution group"). Moreover, the number of retail sale packages in a bundle may vary from bundle to bundle. The number of cards in a bundle may be varied, for example to suit a specific retailer's requirements. Furthermore, the type of card or package may vary within the bundle or from bundle to bundle. For example, one bundle may contain a variety of packages each holding one, two, or six cards. In another example, one bundle may contain retail packages each containing one card and another bundle may contain retail packages each containing two cards. Similarly, the valuation of prepaid cards and other similar types of information may vary from package to package or from bundle to bundle, and/or the like.

Figure 7:
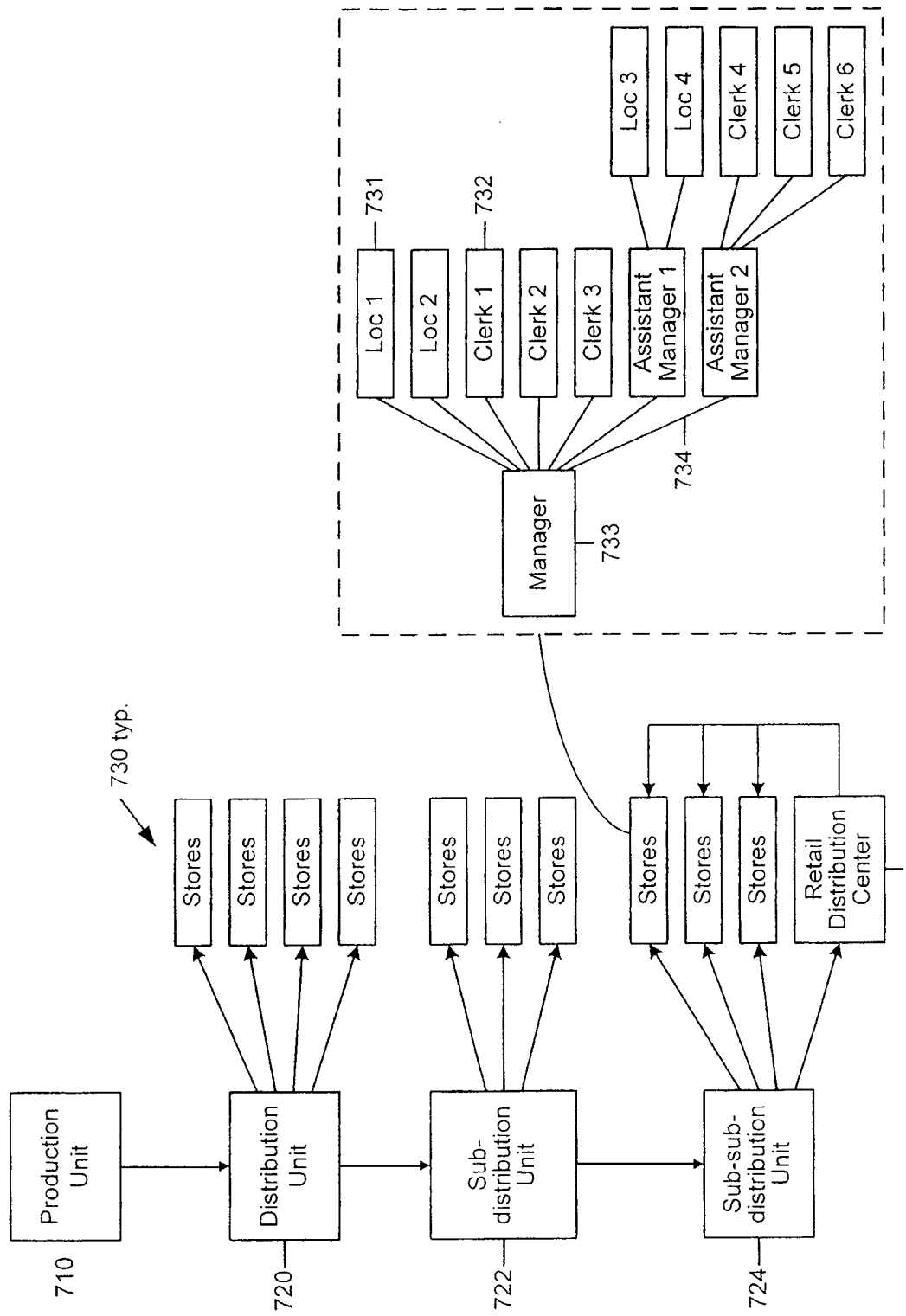
FIG. 7 illustrates a block diagram of an exemplary distribution channel.

The production vendor may be configured to ship a bundle (distribution group) of cards directly to issuer 110, or to third-party distribution vendor 120. System 100 may further be configured to transfer/distribute the bundles through a distribution chain to the retail distributor. With momentary reference to FIG. 7, an exemplary distribution chain is illustrated as having a production vendor 710, a distribution unit 720, a sub-distribution unit 722, a sub-sub-distribution unit 724, a retail distribution center 734, and stores 730. In accordance with various exemplary embodiments of the invention, issuer 110, third-party distribution vendor 120, distribution center 734, and/or a combination of these entities may transfer/distribute the bundles/groups through a distribution chain to retailers, stores, merchants, and/or the like ("retailers"). One exemplary third party distribution vendor is Incomm. The distribution vendor(s) may transfer/distribute the card bundles intact through out the supply chain/stages of distribution to retailers.

For example, production vendor 710 may ship several bundles to distribution unit 720 which may in turn ship a portion of those bundles to sub-distribution units 722. Sub-distribution unit 722 may transfer/distribute a portion of the bundles it receives to sub-sub-distribution unit 724. Any of these distribution entities (e.g., 710, 720, 722, and/or 724) may be configured to transfer/distribute a portion of the bundles they posses to stores or to a retail distribution center 734 related to stores 730. Although described herein as a store, the store may be any entity as described with respect to distribution system 130 and merchants herein.

Upon receipt of a bundle of cards at a retail selling location, in one exemplary embodiment, the bundle is opened and the individual retail packages are displayed via merchandise stands, racks, counters, and/or the like, for distribution to consumers. In yet another embodiment, the card bundles received by a retailer may be transferred/assigned, intact, to a particular department, check out stand, sub-entity, kiosk, employee, and/or the like associated with the retailer. In that example, upon reaching the location associated with the retailer, the bundle may be opened and the individual retail packages may be offered to customers. For example, a store may transfer intact bundles to particular locations 731 within the store, to specific clerks 732 within the store, or to managers/assistant managers (e.g., 733 and 734) within the store. The managers/assistant managers may further transfer the bundles. Thus, identifying the location of a financial transaction account/retail sale package may include determining the physical location of the retail sales package and/or card. Furthermore, identifying the location of a financial transaction account/retail sale package may include identifying the name of the store, the identification of the clerk, the identification of the manager/assistant manager, the department, the point-of-sale terminal, the building, the country, and/or the entity responsible for the retail distribution of the financial transaction account, and/or in possession thereof.

Typically, the individual retail packages are sold to the consumers. However, as described herein, the packages may be given away as promotional devices, or may be distributed to consumers in other ways. Furthermore, as described herein, an individual retail sale package may be offered to the consumer in a publicly accessible manner, for example, in high foot traffic areas of the store, and/or within reach of the customers. In other examples, the card is held behind the customer service desk.

In various embodiments, the financial transaction instruments are open financial transaction instruments. As described herein, the ability to track these instruments to the point of sale/point of distribution to customers may facilitate enhanced security and fraud prevention. Furthermore, the ability to track these cards may facilitate re-claim of expired/expiring cards. Thus, the methods and systems for retroactively tracking financial transaction instruments may facilitate providing these instruments to customers in a customer accessible environment, and may thus enhance the distribution of the financial transaction instruments.

When an individual retail package is sold/distributed to a customer, or during the process thereof, the unique identification number associated with that individual retail package is communicated to the issuer. This information may be communicated directly to issuer 110, or by way of intermediate processing. For example, third-party distribution partner 120 may receive the information and pass the information along to the issuer. In one example, a serial number associated with the individual retail package may be communicated to third-party distribution partner 120, which may be configured to translate and/or pass that information along to issuer 110 (step 660). This information may be communicated, for example, with the reconciliation file, as a batch process, and/or the like.

Based on this unique identification number, and or other information that is commonly provided with such communications/reconciliation files, the reverse inventory management system may be configured to determine the location of other the cards associated with that the distributed card's group.

Reverse inventory management system 100 may also be configured to determine whether a card is sold or unsold, at a particular retailer, at a particular sub-entity associated with that retailer, and/or the like ("inventory status"). Reverse inventory management system 100 may also be configured to identify all of the individual retail packages (or all of the remaining un-distributed individual retail packages) that are associated with the bundle to which one unique identification number belonged. Thus, the reverse inventory management system is based on the distribution of at least one card, out of a group of cards, and the assumption that all other cards associated with the same group as that one card are at the same location.

Information communicated to an issuer indicating that one card has been sold (and the location of that sale) may be used to identify all other cards that were also in that bundle. For example, each card's unique identification number may be associated with the unique ID of every other card, for example in a database/look-up table. By searching the database using the unique ID of the card first sold of a bundle of cards, the system may determine/identify the unique ID numbers of all of the cards that are associated with that bundle. It may be assumed that each of the cards in that bundle, or each of the cards remaining in that bundle, are at that location. In this manner, the inventory data associated with of each card may be updated to reflect the inventory status (e.g., location) of that card.

In another exemplary embodiment, a bundle identifier may be electronically associated with each serial numbered card. Thus, when one card is sold, the serial number of the sold card can be used in a database/look-up table to identify the bundle of which it was a part, and then that bundle identifier can be used to look up all the card serial numbers that were also associated with that bundle.

In yet another exemplary embodiment, a sequential serial number may be associated with each card in a group of, for example, 10 cards. In this example, the number of cards in the group and the starting serial number for that group are stored in a database. Therefore, when a card is sold, the system is configured to determine to which group the sold card belongs. For example, when the first card in the group is sold, the card's unique identification number is identical to an identification number in a database or look up table. Otherwise, the sold card unique identification number may be within 10 of the first number of the group. For example, the system may add or subtract any number between 1 and 10 from the identification number, then compare the result to an identification number in the table. When a card of that group is first sold, the system may update the record of each card to reflect its inventory status. In one embodiment, the system may update the applicable group's inventory status.

With sequential numbered cards, it may be convenient to only store the serial number of the first card in the bundle and the number of cards in the bundle. Thus, in yet another exemplary embodiment, the unique identification number may correspond to a unique group ID number and the system is configured to determine the group ID number based on the unique ID number of the first sold card. The group ID number is then updated to reflect the inventory status of the group. The location of individual cards may be determined by reference to the location of its corresponding group. Furthermore, other methods may also be used wherein the distribution of one card in a group of cards makes possible tracking and inventory functions with respect to all of the other cards in its group.

As described herein, Travelers' Cheque systems or other pre-existing serial number based inventory systems, and other transaction instrument systems may already be configured to perform inventory functions. The utility of these systems may be leveraged by providing the above determined location information to these pre-existing inventory systems.

In accordance with various exemplary embodiments, each time a card is sold, the inventory status may be updated. Thus, the system may be configured to track changes in the inventory status ("dynamic inventory tracking"). For example, the system may be programmed to alert the issuer if part of a group of cards is distributed by one retailer and then part of the group is distributed by another retailer. The system may also be configured to record the location of each card sold for inventory and fraud prevention reasons. Thus, the system is configured to perform tracking of specific serialized inventory down to the store level or lower for purpose of loss control and inventory management (obsolete product recall, changing terms and conditions, expired product, etc.) In addition, system 100 may be configured to modify the location of all the remaining cards/retail sale packages. In this manner, if inventory moves from one location to another, the inventory status may be updated.

One of the benefits of the invention is that it may tend to increase an issuer's prepaid card business. The inability to track and perform inventory management on cards may be one barrier to distributing the product in open retail environments with enormous foot traffic and sales potential. The reverse inventory management system may also facilitate detailed tracking of specific serialized prepaid cards down to the specific selling location level for purposes of loss control and inventory management. Other benefits may include the lowering of operating expenses. For example, reverse inventory management processes may reduce fraud losses and operational costs related to inventory management. The reverse inventory management system may increase the quantity/quality or performance of the issuer's existing services. For example, the reverse inventory management system may improve the ability for the issuer to service the needs of its selling partners and its end customers for these products. The reverse inventory management system may also facilitate selling of cards through a check-out lane and controlling/reducing associated losses and costs. In addition, the reverse inventory management systems and methods may be configured to leverage pre-existing travelers Cheque inventory systems and/or other serial number based pre-existing inventory systems.

Furthermore, the reverse inventory management system may be advantageous to retailers because in some cases, fraud losses on unsold/inactive cards presented and honored under floor limits at the accepting merchants can be traced back and charged to fraud at the original stocking location. In addition, third party sellers may be able to reduce the amount of additional cost and effort involved to meet issuer requirements for tracking and managing inventory. The reverse inventory management system may facilitate inventory management without additional process or systems at the distribution vendors or at the retail level. Furthermore, it may facilitate integration of shipping and receiving financial transaction products and similar products in order to reduce handling and merchandising overhead.

Moreover, the reverse inventory management system may be advantageous to customers. For example, customers that have accidentally walked away from the retail selling location without completing the sales transaction for their card can be directed back to the appropriate original stocking location to remedy the oversight.

The present invention may be described herein in terms of functional block components, optional selections and/or various processing steps. It should be appreciated that such functional blocks may be realized by any number of hardware and/or software components suitably configured to perform the specified functions. For example, the present invention may employ various integrated circuit components, e.g., memory elements, processing elements, logic elements, look-up tables, and/or the like, which may carry out a variety of functions under the control of one or more microprocessors or other control devices. Similarly, the software elements of the present invention may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that the present invention may employ any number of conventional techniques for data transmission, messaging, data processing, network control, and/or the like. Still further, the invention could be used to detect or prevent security issues with a client-side scripting language, such as JavaScript, VBScript or the like. For a basic introduction of cryptography and network security, the following may be helpful references: (1) "Applied Cryptography: Protocols, Algorithms, And Source Code In C," by Bruce Schneier, published by John Wiley & Sons (second edition, 1996); (2) "Java Cryptography" by Jonathan Knudson, published by O'Reilly & Associates (1998); (3) "Cryptography & Network Security Principles & Practice" by Mayiam Stalling, published by Prentice Hall; all of which are hereby incorporated by reference.

It should be appreciated that the particular implementations shown and described herein are illustrative of the invention and its best mode and are not intended to otherwise limit the scope of the present invention in any way. Indeed, for the sake of brevity, conventional data networking, application development and other functional aspects of the systems (and components of the individual operating components of the systems) may not be described in detail herein. It should be noted that many alternative or additional functional relationships or physical connections might be present in a practical transaction instrument distribution system.

As may be appreciated by one of ordinary skill in the art, the present invention may be embodied as a method, a data processing system, a device for data processing, a financial transaction instrument, and/or a computer program product. Accordingly, the present invention may take the form of an entirely software embodiment, an entirely hardware embodiment, or an embodiment combining aspects of both software and hardware or other physical devices. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

These computer program instructions may also be stored in a computer-readable memory that may direct a computer or other programmable data processing apparatus to function in a particular manner, such that the instructions stored in the computer-readable memory produce an article of manufacture including instruction means which implement functions of flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus include steps for implementing the functions specified in the flowchart block or blocks.

In the foregoing specification, the invention has been described with reference to specific embodiments. However, it may be appreciated that various modifications and changes may be made without departing from the scope of the present invention. The specification and figures are to be regarded in an illustrative manner, rather than a restrictive one, and all such modifications are intended to be included within the scope of present invention. Accordingly, the scope of the invention should be determined by the appended claims and their legal equivalents, rather than by the examples given above. For example, the steps recited in any of the method or process claims may be executed in any order and are not limited to the order presented.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical".

What is claimed is:

1. A method, comprising:
   a computer system receiving, from a computing device, via a web page, a request to fund an open transaction account in association with purchase of an open transaction instrument by a consumer at a point of sale device associated with the computing device, wherein the request includes a payment amount, wherein the open transaction instrument is associated with the open transaction account;
   the computer system receiving information identifying the open transaction instrument purchased by the consumer;
   the computer system using the information identifying the open transaction instrument to access a database to verify that the open transaction instrument is eligible to be funded;
   the computer system storing, in the database, physical tracking information for the open transaction instrument, wherein the physical tracking information for the open transaction instrument is accessible in the database using the information identifying the open transaction instrument, and wherein the physical tracking information is usable to determine a physical location of one or more other open transaction instruments;
   the computer system processing the request, wherein said processing includes determining a funded amount based on the payment amount;
   the computer system funding the open transaction account with the funded amount; and
   the computer system transmitting to the computing device an authorization message indicating that the open transaction account was funded with the funded amount and specifying authorization to distribute the open transaction instrument to the consumer.

2. The method of claim 1, wherein said determining the funded amount comprises deducting an administrative charge amount from the payment amount.

3. The method of claim 1, wherein a tracking code is included on at least one of: the open transaction instrument and a sleeve associated with the open transaction instrument.

4. The method of claim 1, wherein the open transaction instrument is configured with geographic restrictions.

5. The method of claim 1, wherein said determining the funded amount comprises determining an amount of loyalty points associated with a loyalty program, wherein said funding the open transaction account with the funded amount comprises funding the open transaction account with the amount of loyalty points.

6. The method of claim 1,
   wherein the request received by the computer system comprises a request to fund the open transaction account without activating the open transaction account;
   wherein the computer system does not activate the open transaction account in processing the request.

7. The method of claim 6,
   wherein the computer system includes an interactive voice response (IVR) system;
   wherein the method further comprises:
      the computer system activating the open transaction account in response to the IVR system receiving a request to activate the open transaction account subsequently to distribution of the open transaction instrument to the consumer at the point of sale device.

8. The method of claim 1,
   wherein the request received by the computer system comprises a request to both fund the open transaction account and activate the open transaction account;
   wherein said processing the request further includes the computer system activating the open transaction account.

9. The method of claim 1,
   wherein said processing the request further includes the computer system verifying that the open transaction instrument is listed as available inventory in the database.

10. The method of claim 1,
   wherein said processing the request further includes:
      prior to transmitting the authorization message, the computer system verifying that status information for the open transaction instrument indicates that the open transaction instrument has not already been sold; and subsequently to said verifying, the computer system updating the status information to indicate that the open transaction instrument has been sold.

11. The method of claim 1,
wherein the request further includes a location of the point of sale device;
wherein said processing the request further includes:
prior to transmitting the authorization message, the computer system verifying that status information for the open transaction instrument indicates that the open transaction instrument is located at the location of the point of sale device.

12. The method of claim 1,
wherein the point of sale device is located at a distributor;
wherein the computer system is associated with an issuer;
wherein the open transaction instrument has an identification number, wherein the request to fund the open transaction instrument further includes the identification number;
wherein said processing the request further includes the computer system determining an amount owed by the distributor to the issuer based on the identification number.

13. The method of claim 1,
wherein the open transaction instrument is a particular open transaction instrument;
wherein the request further includes a location of the point of sale device of the particular open transaction instrument;
wherein said processing the request further includes:
the computer system identifying one or more other open transaction instruments associated with the particular transaction instrument; and
for each respective open transaction instrument of the one or more other open transaction instruments, updating location information for the respective open transaction instrument to indicate that the respective open transaction instrument is at the location of the point of sale device of the particular open transaction instrument.

14. A non-transitory, computer-readable storage medium storing program instructions executable by one or more processors to cause a computer system to:
receive, from a computing device, via a web page, a request to fund an open transaction account in association with purchase of an open transaction instrument by a consumer at a point of sale device associated with the computing device, wherein the request includes a payment amount, wherein the open transaction instrument is associated with the open transaction account;
receive information identifying the open transaction instrument purchased by the consumer;
use the information identifying the open transaction instrument to access a database to verify that the open transaction instrument is eligible to be funded;
store, in the database, physical tracking information for the open transaction instrument, wherein the physical tracking information is accessible in the database using the information identifying the open transaction instrument, and wherein the physical tracking information is usable to determine a physical location of one or more other open transaction instruments;
process the request, wherein said processing includes determining a funded amount based on the payment amount;
fund the open transaction account with the funded amount; and
transmit to the computing device an authorization message indicating that the open transaction account was funded with the funded amount and specifying authorization to distribute the open transaction instrument to the consumer.

15. The non-transitory, computer-readable storage medium of claim 14, wherein the physical tracking information for the open transaction instrument comprises information indicating a geographical location associated with the point of sale device.

16. The non-transitory, computer-readable storage medium of claim 14,
wherein the request received by the computer system comprises a request to both fund the open transaction account and activate the open transaction account;
wherein said processing the request further includes activating the open transaction account.

17. The non-transitory, computer-readable storage medium of claim 14,
wherein said processing the request further includes:
prior to transmitting the authorization message, verifying that status information for the open transaction instrument indicates that the open transaction instrument has not already been sold; and
subsequently to said verifying, updating the status information to indicate that the open transaction instrument has been sold.

18. A system comprising:
one or more processors; and
memory storing program instructions, wherein the program instructions are executable by the one or more processors to:
receive, from a computing device, via a web page, a request to fund an open transaction account in association with purchase of an open transaction instrument by a consumer at a point of sale device associated with the computing device, wherein the request includes a payment amount, wherein the open transaction instrument is associated with the open transaction account;
receive information identifying the open transaction instrument purchased by the consumer;
use the information identifying the open transaction instrument to access a database to verify that the open transaction instrument is eligible to be funded;
store, in the database, physical tracking information for the open transaction instrument, wherein the physical tracking information is accessible in the database using the information identifying the open transaction instrument, and wherein the physical tracking information is usable to determine a physical location of one or more other open transaction instruments;
process the request, wherein said processing includes determining a funded amount based on the payment amount;
fund the open transaction account with the funded amount; and
transmit to the computing device an authorization message indicating that the open transaction account was funded with the funded amount and specifying authorization to distribute the open transaction instrument to the consumer.

19. The system of claim 18, wherein the physical tracking information for the open transaction instrument comprises information indicating a geographical location associated with a retail store that is associated with the point of sale device.

20. The system of claim 18, wherein said processing the request further includes verifying that the open transaction instrument is listed as available inventory in the database.

* * * * *